United States Patent
Sainath et al.

(10) Patent No.: US 12,488,791 B2
(45) Date of Patent: Dec. 2, 2025

(54) CONTEXTUAL BIASING WITH TEXT INJECTION

(71) Applicant: Google LLC, Mountain View, CA (US)

(72) Inventors: Tara N. Sainath, Jersey City, NJ (US); Rohit Prakash Prabhavalkar, Palo Alto, CA (US); Diamantino Antonio Caseiro, Philadelphia, PA (US); Patrick Maxim Rondon, New York, NY (US); Cyril Allauzen, Mountain View, CA (US)

(73) Assignee: Google LLC, Mountain View, CA (US)

( * ) Notice: Subject to any disclaimer, the term of this patent is extended or adjusted under 35 U.S.C. 154(b) by 228 days.

(21) Appl. No.: 18/490,861

(22) Filed: Oct. 20, 2023

(65) Prior Publication Data

US 2024/0153498 A1 May 9, 2024

Related U.S. Application Data

(60) Provisional application No. 63/381,091, filed on Oct. 26, 2022.

(51) Int. Cl.
*G10L 15/16* (2006.01)
*G10L 15/06* (2013.01)
*G10L 15/183* (2013.01)

(52) U.S. Cl.
CPC ............ *G10L 15/16* (2013.01); *G10L 15/063* (2013.01); *G10L 15/183* (2013.01)

(58) Field of Classification Search
CPC ....... G10L 15/063; G10L 15/16; G10L 13/08; G10L 15/26; G06N 3/044
See application file for complete search history.

(56) References Cited

U.S. PATENT DOCUMENTS

2020/0342852 A1* 10/2020 Kim ..................... G06F 40/40
2020/0357388 A1 11/2020 Zhao et al.
(Continued)

FOREIGN PATENT DOCUMENTS

WO 2020226789 A1 11/2020

OTHER PUBLICATIONS

Karita Shigeki et al: "Semi-Supervised End-to-End Speech Recognition", Interspeech 2018, [Online] Sep. 6, 2018 (Sep. 6, 2018), pp. 2-6, XP055890781.
(Continued)

*Primary Examiner* — Michael Colucci
(74) *Attorney, Agent, or Firm* — Honigman LLP; Brett A. Krueger; Grant Griffith

(57) ABSTRACT

A method includes receiving context biasing data that includes a set of unspoken textual utterances corresponding to a particular context. The method also includes obtaining a list of carrier phrases associated with the particular context. For each respective unspoken textual utterance, the method includes generating a corresponding training data pair that includes the respective unspoken textual utterance and a carrier phrase. For each respective training data pair, the method includes tokenizing the respective training data pair into a sequence of sub-word units, generating a first higher order textual feature representation for a corresponding sub-word unit, receiving the first higher order textual feature representation, and generating a first probability distribution over possible text units. The method also includes training a speech recognition model based on the first probability distribution over possible text units.

24 Claims, 8 Drawing Sheets

(56) References Cited

U.S. PATENT DOCUMENTS

| | | | | |
|---|---|---|---|---|
| 2021/0183373 A1* | 6/2021 | Moritz | ................... | G06N 3/045 |
| 2021/0225362 A1* | 7/2021 | Sainath | ................. | G10L 15/063 |
| 2021/0280170 A1* | 9/2021 | Chen | ...................... | G06N 3/088 |
| 2021/0350786 A1* | 11/2021 | Chen | ....................... | G10L 13/08 |
| 2022/0020355 A1* | 1/2022 | Ming | ................... | G06F 40/253 |
| 2022/0147838 A1* | 5/2022 | Gu | ........................ | G06V 20/00 |
| 2022/0230628 A1* | 7/2022 | Zhu | ....................... | G10L 15/063 |
| 2023/0169281 A1* | 6/2023 | Zheng | .................... | G10L 15/28 |
| | | | | 704/2 |
| 2023/0223018 A1* | 7/2023 | Xing | ....................... | G10L 15/22 |
| | | | | 704/232 |
| 2023/0343319 A1* | 10/2023 | Hu | ....................... | G06N 3/0442 |

OTHER PUBLICATIONS

International Search Report and Written Opinion issued in related PCT Application No. PCT/US2023/035572, dated Feb. 12, 2024.

* cited by examiner

CONTEXTUAL BIASING WITH TEXT INJECTION

CROSS REFERENCE TO RELATED APPLICATIONS

This U.S. Patent Application claims priority under 35 U.S.C. § 119(e) to U.S. Provisional Application 63/381,091, filed on Oct. 26, 2022. The disclosure of this prior application is considered part of the disclosure of this application and is hereby incorporated by reference in its entirety.

TECHNICAL FIELD

This disclosure relates to contextual biasing with text injection.

BACKGROUND

Automatic speech recognition (ASR), the process of taking an audio input and transcribing it into text, has greatly been an important technology that is used in mobile devices and other devices. In general, automatic speech recognition attempts to provide accurate transcriptions of what a person has said by taking an audio input (e.g., speech utterance) and transcribing the audio input into text. Modern ASR models continue to improve in both accuracy (e.g., a low word error rate (WER)) and latency (e.g., delay between the client speaking and the transcription) based on the ongoing development of deep neural networks. However, one challenge in developing deep learning-based ASR models is the parameters of the ASR models tend to over fit the training data, thereby resulting in the ASR models having difficulties generalizing unseen data when the training data is not extensive enough. In some instances, ASR models use biasing to increase a probability of transcribing particular words or phrases. However, conventional biasing techniques cause significant WER and latency degradation of ASR models, especially as a number of biasing phrases increases.

SUMMARY

One aspect of the disclosure provides a computer-implemented method that when executed on data processing hardware causes the data processing hardware to perform operations for training an automatic speech recognition model using contextual biasing with text injection. The operations include receiving context biasing data that includes a set of unspoken textual utterances corresponding to a particular context. Each unspoken textual utterance in the set of unspoken textual utterances is not paired with any corresponding spoken utterance of speech. The operations also include obtaining a list of carrier phrases associated with the particular context of the set of unspoken textual utterances. For each respective unspoken textual utterance in the set of unspoken textual utterances, the operations include generating a corresponding training data pair that includes the respective unspoken textual utterance paired with a carrier phrase from among the list of carrier phrases. For each respective training data pair, the operations include: tokenizing the respective training data pair into a sequence of sub-word units; generating, by a text encoder at each of a plurality of output steps, a first higher order textual feature representation for a corresponding sub-word unit in the sequence of sub-word units tokenized from the respective training data pair; receiving the first higher order textual feature representation generated by the text encoder at each of the plurality of output steps as input to a first decoder of a speech recognition model; and generating, by the first decoder, a first probability distribution over possible text units at each of the plurality of output steps. The operations also include training the speech recognition model based on the first probability distribution over possible text units generated by the first decoder at each of the plurality of output steps for each respective training data pair.

Implementations of the disclosure may include one or more of the following optional features. In some implementations, the particular context includes at least one of a song, a contract, an application, an entity, or a geographic location. In some examples, the list of carrier phrases includes at least one of call, message, play, open, or directions to. The operations may further include tokenizing the respective training data pair into one or more alternate sequences of sub-word units each including at least one different sub-word unit in the alternate sequence of sub-word units than a corresponding sub-word unit in the sequence of sub-word units. Here, the respective training data pair includes the sequence of sub-word units and the one or more alternate sequence of sub-word units.

In some examples, for each unspoken textual utterance in the set of unspoken textual utterances, the operations further include: receiving the first higher order textual feature representation generated by the text encoder at each of the plurality of output steps as input to a shared audio-text encoder of the speech recognition model; generating, by the shared audio-text encoder, a second higher order textual feature representation for a corresponding first higher order textual feature representation in a shared latent representation space at each of the plurality of output steps; receiving the second higher order textual feature representation generated by the shared audio-text encoder at each of the plurality of output steps as input to a second decoder of the speech recognition model; and generating a second probability distribution over possible text units by the second decoder at each of the plurality of output steps. In these examples, training the speech recognition model is further based on the second probability distribution over possible text units generated by the second decoder at each of the plurality of output steps for each unspoken textual utterance in the set of unspoken textual utterances. In these examples, the operations may further include receiving a set of transcribed speech utterances each paired with a corresponding transcription and represented by a corresponding sequence of acoustic frames and, for each transcribed speech utterance in the set of transcribed speech utterances, generating, by an audio encoder of the speech recognition model, a first higher order audio feature representation for a corresponding acoustic frame in the sequence of acoustic frames representing the transcribed speech utterance at each of a plurality of output steps; receiving, as input to the first decoder of the speech recognition model, the first higher order audio feature representation generated by the audio encoder at each of the plurality of output steps; and generating, by the first decoder, a first probability distribution over possible speech recognition hypotheses at each of a plurality of output steps. Here, training the speech recognition model is further based on the first probability distribution over possible speech recognition hypotheses generated by the first decoder at each of the plurality of output steps for each transcribed speech utterance in the set of transcribed speech utterances.

In some implementations, for each transcribed speech utterance in the set of transcribed speech utterances, the operations further include: receiving, as input to the shared audio-text encoder of the speech recognition model, the first higher order audio feature representation generated by the audio encoder at each of the plurality of output steps; generating, by the shared audio-text encoder, a second higher order audio feature representation for a corresponding first higher order audio feature representation in the shared latent representation space at each of the plurality of output steps; receiving, as input to the second decoder of the speech recognition model, the second higher order audio feature representation generated by the shared audio-text encoder at each of the plurality of output steps; and generating, by the second decoder, a second probability distribution over possible speech recognition hypotheses at each of the plurality of output steps. Here, training the speech recognition model is further based on the second probability distribution over possible speech recognition hypotheses generated by the second decoder at each of the plurality of output steps for each transcribed speech utterance in the set of transcribed speech utterances. In these implementations, training the speech recognition model may include jointly training the speech recognition model using the first and second probability distributions over possible text units and the first and second probability distributions over possible speech recognition hypotheses. The operations may include receiving the second probability distribution over possible speech recognition hypotheses at a contextual finite-state transducer (FST), determining, using the contextual FST, context scores for each possible speech recognition hypotheses of the second probability distribution based on context data, and executing a beam search decoding process to select a respective one of the possible speech recognition hypotheses of the second probability distribution based on the context scores and the second probability distribution.

In some examples, the first decoder includes a prediction network configured to receive a sequence of N previous non-blank symbols output by a final Softmax layer as input and generate a dense representation at each of the plurality of output steps and a joint network configured to receive the first higher order textual feature representation generated by the text encoder at each of the plurality of output steps and the dense representation generated by the prediction network at each of the plurality of output steps as input and generate the first probability distribution over possible text units at each of the plurality of output steps. For each respective training data pair, the operations may further include upsampling a distribution of the sequence of sub-word units tokenized from the respective training data pair using a parameter free duration model and randomly masking a portion of the upsampled distribution of the sequence of sub-word units. In some implementations, each sub-word unit in the sequence of sub-word units includes one of a phoneme or a wordpiece and each text unit in the first probability distribution over possible text units includes a wordpiece.

Another aspect of the disclosure provides a system that includes data processing hardware and memory hardware storing instructions that when executed on the data processing hardware causes the data processing hardware to perform operations. The operations include receiving context biasing data that includes a set of unspoken textual utterances corresponding to a particular context. Each unspoken textual utterance in the set of unspoken textual utterances is not paired with any corresponding spoken utterance of speech. The operations also include obtaining a list of carrier phrases associated with the particular context of the set of unspoken textual utterances. For each respective unspoken textual utterance in the set of unspoken textual utterances, the operations include generating a corresponding training data pair that includes the respective unspoken textual utterance paired with a carrier phrase from among the list of carrier phrases. For each respective training data pair, the operations include: tokenizing the respective training data pair into a sequence of sub-word units; generating, by a text encoder at each of a plurality of output steps, a first higher order textual feature representation for a corresponding sub-word unit in the sequence of sub-word units tokenized from the respective training data pair; receiving the first higher order textual feature representation generated by the text encoder at each of the plurality of output steps as input to a first decoder of a speech recognition model; and generating, by the first decoder, a first probability distribution over possible text units at each of the plurality of output steps. The operations also include training the speech recognition model based on the first probability distribution over possible text units generated by the first decoder at each of the plurality of output steps for each respective training data pair.

Implementations of the disclosure may include one or more of the following optional features. In some implementations, the particular context includes at least one of a song, a contract, an application, an entity, or a geographic location. In some examples, the list of carrier phrases includes at least one of call, message, play, open, or directions to. The operations may further include tokenizing the respective training data pair into one or more alternate sequences of sub-word units each including at least one different sub-word unit in the alternate sequence of sub-word units than a corresponding sub-word unit in the sequence of sub-word units. Here, the respective training data pair includes the sequence of sub-word units and the one or more alternate sequence of sub-word units.

In some examples, for each unspoken textual utterance in the set of unspoken textual utterances, the operations further include: receiving the first higher order textual feature representation generated by the text encoder at each of the plurality of output steps as input to a shared audio-text encoder of the speech recognition model; generating, by the shared audio-text encoder, a second higher order textual feature representation for a corresponding first higher order textual feature representation in a shared latent representation space at each of the plurality of output steps; receiving the second higher order textual feature representation generated by the shared audio-text encoder at each of the plurality of output steps as input to a second decoder of the speech recognition model; and generating a second probability distribution over possible text units by the second decoder at each of the plurality of output steps. In these examples, training the speech recognition model is further based on the second probability distribution over possible text units generated by the second decoder at each of the plurality of output steps for each unspoken textual utterance in the set of unspoken textual utterances. In these examples, the operations may further include receiving a set of transcribed speech utterances each paired with a corresponding transcription and represented by a corresponding sequence of acoustic frames and, for each transcribed speech utterance in the set of transcribed speech utterances, generating, by an audio encoder of the speech recognition model, a first higher order audio feature representation for a corresponding acoustic frame in the sequence of acoustic frames representing the transcribed speech utterance at each of a plurality of output steps; receiving, as input to the first decoder of the speech recognition model, the first higher order audio feature representation generated by the audio encoder at each of the plurality of output steps; and generating, by the first decoder, a first probability distribution over possible speech recognition hypotheses at each of a plurality of output steps. Here, training the speech recognition model is further based on the first probability distribution over possible speech recognition hypotheses generated by the first decoder at each of the plurality of output steps for each transcribed speech utterance in the set of transcribed speech utterances.

In some implementations, for each transcribed speech utterance in the set of transcribed speech utterances, the operations further include: receiving, as input to the shared audio-text encoder of the speech recognition model, the first higher order audio feature representation generated by the audio encoder at each of the plurality of output steps; generating, by the shared audio-text encoder, a second higher order audio feature representation for a corresponding first higher order audio feature representation in the shared latent representation space at each of the plurality of output steps; receiving, as input to the second decoder of the speech recognition model, the second higher order audio feature representation generated by the shared audio-text encoder at each of the plurality of output steps; and generating, by the second decoder, a second probability distribution over possible speech recognition hypotheses at each of the plurality of output steps. Here, training the speech recognition model is further based on the second probability distribution over possible speech recognition hypotheses generated by the second decoder at each of the plurality of output steps for each transcribed speech utterance in the set of transcribed speech utterances. In these implementations, training the speech recognition model may include jointly training the speech recognition model using the first and second probability distributions over possible text units and the first and second probability distributions over possible speech recognition hypotheses. The operations may include receiving the second probability distribution over possible speech recognition hypotheses at a contextual finite-state transducer (FST), determining, using the contextual FST, context scores for each possible speech recognition hypotheses of the second probability distribution based on context data, and executing a beam search decoding process to select a respective one of the possible speech recognition hypotheses of the second probability distribution based on the context scores and the second probability distribution.

In some examples, the first decoder includes a prediction network configured to receive a sequence of N previous non-blank symbols output by a final Softmax layer as input and generate a dense representation at each of the plurality of output steps and a joint network configured to receive the first higher order textual feature representation generated by the text encoder at each of the plurality of output steps and the dense representation generated by the prediction network at each of the plurality of output steps as input and generate the first probability distribution over possible text units at each of the plurality of output steps. For each respective training data pair, the operations may further include upsampling a distribution of the sequence of sub-word units tokenized from the respective training data pair using a parameter free duration model and randomly masking a portion of the upsampled distribution of the sequence of sub-word units. In some implementations, each sub-word unit in the sequence of sub-word units includes one of a phoneme or a wordpiece and each text unit in the first probability distribution over possible text units includes a wordpiece.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1:
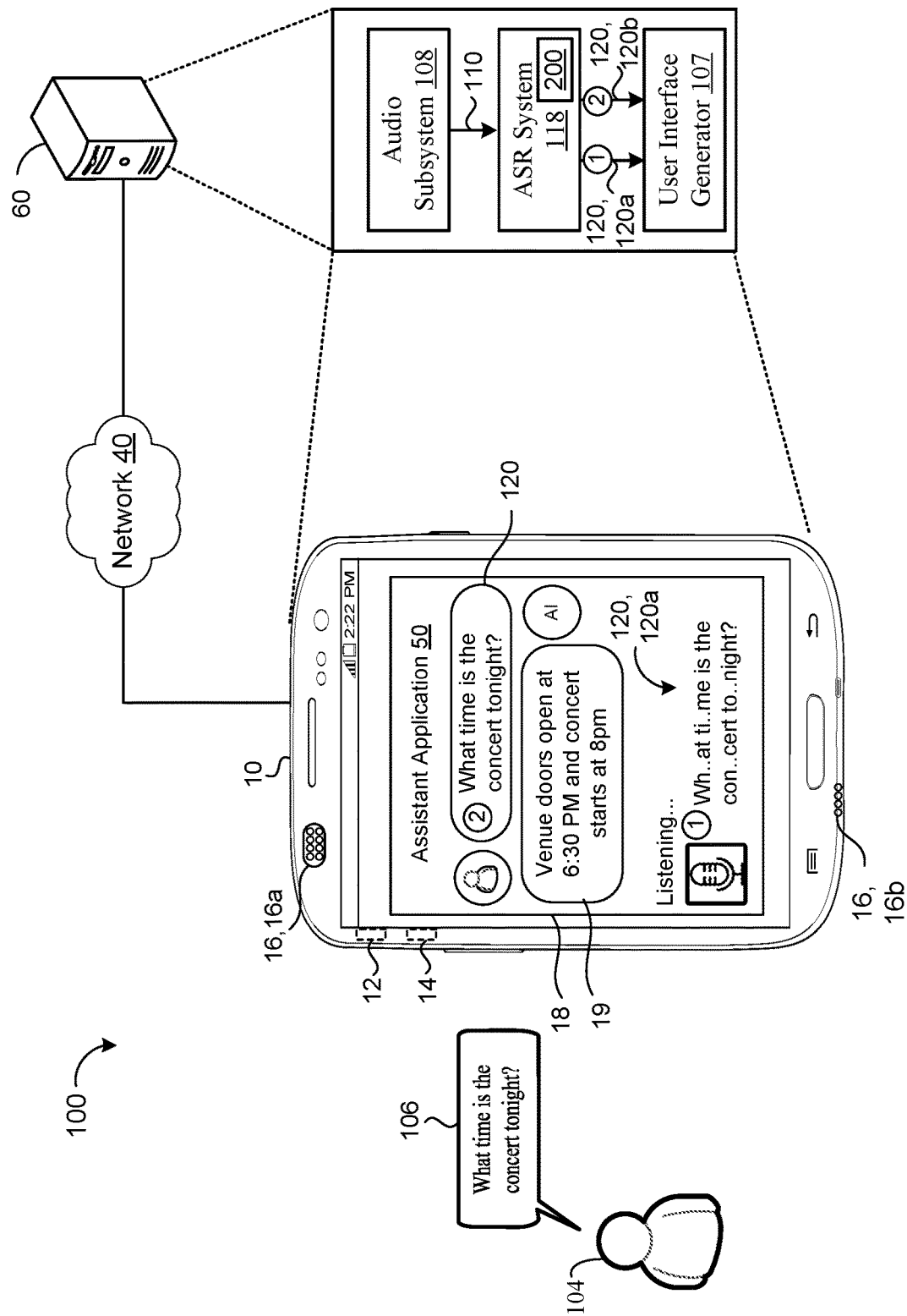
FIG. 1 is a schematic view of an example speech recognition system.

One challenge in developing deep learning-based ASR models is that parameters of the ASR models tend to over fit the training data, thereby resulting in the ASR models having difficulties generalizing unseen data when the training data is not extensive enough. Thus, training ASR models on larger training datasets improves the accuracy of the ASR model. For instance, the use of machine learning or other statistical methods can train ASR models on training data sets that include upwards of 10,000 hours of transcribed speech. Yet, performance of ASR models suffers when a domain associated with the training data is distinct from a domain at which the ASR model will be deployed during inference. For example, training an ASR model on transcribed speech in a domain associated with video meetings would be less effective in recognizing speech related to voice search queries, and vice versa.

Despite the above, even after training ASR models on large training datasets, ASR models may still receive speech that corresponds to particular words not seen during training. For instance, some named entities (e.g., contact names, song names, location names, etc.) are infrequently included in ASR training datasets or, in some examples, not included at all. In these instances, the named entities may be unique to a particular user and only include textual representations without any corresponding audio representations. Consequently, these named entities are rarely included in training data used to train ASR models causing the ASR model to misrecognize these named entities when spoken by certain users. Thus, accurately recognizing these unseen utterances during inference without significantly increasing word error rates (WER) for seen utterances or increasing latency would be significant improvement for current ASR models.

Accordingly, implementations herein are directed towards methods and systems for injecting contextually biased data into an automatic speech recognition (ASR) model. In particular, a training process trains the ASR model by receiving context biasing data that includes a set of unspoken textual utterances corresponding to a particular context.

Each unspoken textual utterance in the set of unspoken textual utterances is not paired with any corresponding spoken utterance of speech. The training process also obtains a list of carrier phrases associated with the particular context of the set of unspoken textual utterances and generates a corresponding training data pair including a respective unspoken textual utterance paired with a carrier phrase for each respective unspoken textual utterance. For each respective training data pair, the training process tokenizes the respective training data pair into a sequence of sub-word units (e.g., alignment output), generates a first higher order textual feature representation for a corresponding sub-word unit using a text encoder of the ASR model, and generates a first probability distribution over possible text units using a first-pass decoder. The training process trains the ASR model based on the first probability distribution over possible text units generated by the first-pass decoder. In some examples, training the ASR model includes updating parameters of an encoder of the ASR model. Advantageously, training the ASR model on the generated training data pairs injects text-only contextual data that would otherwise be unavailable (e.g., because the training data pairs do not have corresponding audio data) to train the ASR model on.

As will become apparent, the encoder of the speech recognition model operates in both a streaming and non-streaming fashion during the training process such that the encoder trains on losses derived during streaming and non-streaming operation. Moreover, the training process may train the encoder using training data that additionally includes a set of transcribed speech utterances each paired with a corresponding transcription. Thus, leveraging the unspoken textual utterances and the transcribed speech utterances the training process is able to train the encoder of the speech recognition model using shared latent representations of speech and text modalities.

FIG. 1 is an example of a system 100 that includes a user device 10 and a remote computing device 60. One or more users 104 may interact with the user device 10 through voice input. The user device 10 (also referred to generally as a device 10) is configured to capture sounds (e.g., streaming audio data) spoken by the one or more users 104. Here, the streaming audio data may refer to an utterance 106 spoken by the user 104 that functions as an audible query, a command for the user device 10, or an audible communication captured by the device 10. Speech-enabled systems of the user device 10 may field the query or the command by answering the query and/or causing the command to be performed/fulfilled by one or more downstream applications.

The user device 10 may correspond to any computing device associated with the one or more users 104 and capable of receiving audio data. Some examples of user devices 10 include, but are not limited to, mobile devices (e.g., smart watches), smart appliances, internet of things (IoT) devices, vehicle infotainment systems, smart displays, smart speakers, etc. The user device 10 includes data processing hardware 12 and memory hardware 14 in communication with the data processing hardware 12 and stores instructions that, when executed by the data processing hardware 12, cause the data processing hardware 12 to perform one or more operations. The user device 10 further includes an audio system 16 with an audio capture device (e.g., microphone) 16, 16a for capturing and converting the utterances 106 into electrical signals and a speech output device (e.g., a speaker) 16, 16b for communicating with an audible audio signal (e.g., as output data from the user device 10). The user device 10 may implement an array of audio capture devices 16a without departing from the scope of the present disclosure, whereby one or more capture devices 16a in the array may not physically reside on the user device 10, but be in communication with the audio system 16.

The system 100 includes an automated speech recognition (ASR) system 118 that implements an ASR model 200 that resides on the user device 10 of the user 104 and/or on the remote computing device 60 (e.g., one or more remote servers of a distributed system executing in a cloud-computing environment) in communication with the user device 10 via a network 40. In some examples, the ASR model 200 may be a recurrent neural network-transducer (RNN-T) model. The user device 10 and/or the remote computing device 60 also include an audio subsystem 108 configured to receive the utterance 106 spoken by the user 104 and captured by the audio capture device 16a, and convert the utterance 106 into a corresponding digital format associated with input acoustic frames 110 capable of being processed by the ASR system 118. In the example shown, the user 104 speaks a respective utterance 106 and the audio subsystem 108 converts the utterance 106 into corresponding audio data (e.g., sequence of acoustic frames) 110 for input to the ASR system 118. Thereafter, the ASR model 200 receives, as input, the sequence of acoustic frames 110 corresponding to the utterance 106, and generates/predicts, at each output step of a plurality of output steps, a corresponding transcription 120 (e.g., speech recognition result/hypothesis) of the utterance 106 as the ASR model 200 receives (e.g., processes) each acoustic frame 110 in the sequence of acoustic frames 110.

In the example shown, the ASR model 200 may perform streaming speech recognition to produce an initial speech recognition result 120, 120a and generate a final speech recognition result 120, 120b by improving the initial speech recognition result 120a. The speech recognition results 120 may either correspond to a partial speech recognition result or an entire speech recognition result. Stated differently, the speech recognition result 120 may either correspond to a portion of an utterance 106 or an entire utterance 106. For example, the partial speech recognition result may correspond to a portion of a spoken utterance or even a portion of a spoken term. However, as will become apparent, the ASR model 200 performs additional processing on the final speech recognition result 120b whereby the final speech recognition result 120b may be delayed from the initial speech recognition result 120a.

The user device 10 and/or the remote computing device 60 also executes a user interface generator 107 configured to present a representation of the transcription 120 of the utterance 106 to the user 104 of the user device 10. As described in greater detail below, the user interface generator 107 may display the initial speech recognition results 120a in a streaming fashion during time 1 and subsequently display the final speech recognition results 120b in a streaming fashion during time 2. Notably, the ASR model 200 outputs the final speech recognition results 120b in a streaming fashion even though the final speech recognition results 120b improve upon the initial speech recognition result 120a. In some configurations, the transcription 120 output from the ASR system 118 is processed, e.g., by a natural language understanding (NLU) module executing on the user device 10 or the remote computing device 60, to execute a user command/query specified by the utterance 106. Additionally or alternatively, a text-to-speech system (not shown) (e.g., executing on any combination of the user device 10 or the remote computing device 60) may convert the transcription 120 into synthesized speech for audible output by the user device 10 and/or another device.

In the example shown, the user 104 interacts with a program or application 50 (e.g., the digital assistant application 50) of the user device 10 that uses the ASR system 118. For instance, FIG. 1 depicts the user 104 communicating with the digital assistant application 50 and the digital assistant application 50 displaying a digital assistant interface 18 on a screen of the user device 10 to depict a conversation between the user 104 and the digital assistant application 50. In this example, the user 104 asks the digital assistant application 50, "What time is the concert tonight?" This question from the user 104 is a spoken utterance 106 captured by the audio capture device 16a and processed by audio system 16 of the user device 10. In this example, the audio system 16 receives the spoken utterance 106 and converts it into a sequence of acoustic frames 110 for input to the ASR system 118.

Continuing with the example, the ASR model 200, while receiving the sequence of acoustic frames 110 corresponding to the utterance 106 as the user 104 speaks, encodes the sequence of acoustic frames 110 and then decodes the encoded sequence of acoustic frames 110 into the initial speech recognition results 120a. During time 1, the user interface generator 107 presents, via the digital assistant interface 18, a representation of the initial speech recognition results 120a of the utterance 106 to the user 104 of the user device 10 in a streaming fashion such that words, word pieces, and/or individual characters appear on the screen as soon as they are spoken. In some examples, the first look ahead audio context is equal to zero.

During time 2, the user interface generator 107 presents, via the digital assistant interface 18, a representation of the final speech recognition results 120b of the utterance 106 to the user 104 of the user device 10 a streaming fashion such that words, word pieces, and/or individual characters appear on the screen as soon as they are generated by the ASR model 200. In some implementations, the user interface generator 107 replaces the representation of the initial speech recognition results 120a presented at time 1 with the representation of the final speech recognition results 120b presented at time 2. Here, time 1 and time 2 may include timestamps corresponding to when the user interface generator 107 presents the respective speech recognition result 120. In this example, the timestamp of time 1 indicates that the user interface generator 107 presents the initial speech recognition results 120a at an earlier time than the final speech recognition results 120b. For instance, as the final speech recognition result 120b is presumed to be more accurate than the initial speech recognition result 120a, the final speech recognition result 120b ultimately displayed as the transcription 120 may fix any terms that may have been misrecognized in the initial speech recognition results 120a. In this example, the streaming initial speech recognition results 120a output by the ASR model 200 are displayed on the screen of the user device 10 at time 1 are associated with low latency and provide responsiveness to the user 104 that his/her query is being processed, while the final speech recognition result 120b output by the ASR model 200 and displayed on the screen at time 2 leverages an additional speech recognition model and/or a language model to improve the speech recognition quality in terms of accuracy, but at increased latency. However, since the initial speech recognition results 120a are displayed as the user speaks the utterance 106, the higher latency associated with producing, and ultimately displaying the final speech recognition results 120b is not noticeable to the user 104.

In the example shown in FIG. 1, the digital assistant application 50 may respond to the question posed by the user 104 using natural language processing. Natural language processing generally refers to a process of interpreting written language (e.g., the initial speech recognition result 120a and/or the final speech recognition result 120b) and determining whether the written language prompts any action. In this example, the digital assistant application 50 uses natural language processing to recognize that the question from the user 104 regards the user's schedule and more particularly a concert on the user's schedule. By recognizing these details with natural language processing, the automated assistant returns a response 19 to the user's query where the response 19 states, "Venue doors open at 6:30 PM and concert starts at 8 pm." In some configurations, natural language processing occurs on a remote computing device 60 in communication with the data processing hardware 12 of the user device 10.

Figure 2:
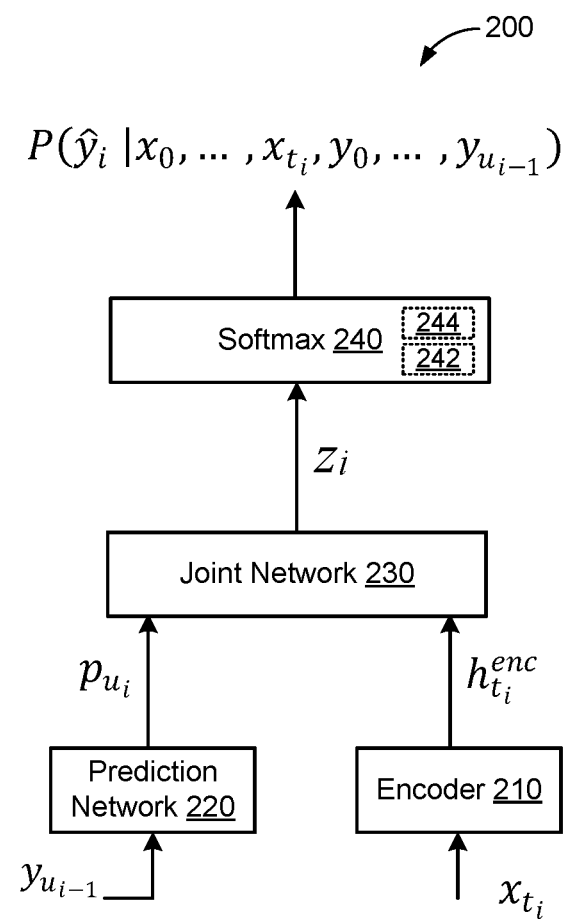
FIG. 2 is a schematic view of an example speech recognition model.

Referring to FIG. 2, in some examples, the ASR model 200 includes a Recurrent Neural Network-Transducer (RNN-T) model architecture which adheres to latency constraints associated with interactive applications. The use of the RNN-T model architecture is exemplary only, and the ASR model 200 may include other architectures such as transformer-transducer and conformer-transducer model architectures among others. The RNN-T model architecture of the ASR model 200 provides a small computational footprint and utilizes less memory requirements than conventional ASR architectures, making the RNN-T model architecture suitable for performing speech recognition entirely on the user device 102 (e.g., no communication with a remote server is required). The RNN-T model architecture of the ASR model 200 includes an encoder network 210, a prediction network 220, and a joint network 230. The encoder network 210, which is roughly analogous to an acoustic model (AM) in a traditional ASR system, includes a stack of self-attention layers (e.g., Conformer or Transformer layers) or a recurrent network of stacked Long Short-Term Memory (LSTM) layers. For instance, the encoder reads a sequence of d-dimensional feature vectors (e.g., acoustic frames 110 (FIG. 1)) $x=(x_1, x_2, \ldots, x_T)$, where $x_t \in \mathbb{R}^d$, and produces at each output step a higher-order feature representation. This higher-order feature representation is denoted as $h_1^{enc}, \ldots, h_T^{enc}$.

Similarly, the prediction network 220 is also an LSTM network, which, like a language model (LM), processes the sequence of non-blank symbols output by a final Softmax layer 240 so far, $y_0, \ldots, y_{ui-1}$, into a dense representation $p_{u_i}$. Finally, with the RNN-T model architecture, the representations produced by the encoder and prediction/decoder networks 210, 220 are combined by the joint network 230. The prediction network 220 may be replaced by an embedding look-up table to improve latency by outputting looked-up sparse embeddings in lieu of processing dense representations. The joint network then predicts $P(y_i|x_{t_i}, y_0, \ldots, y_{u_{i-1}})$, which is a distribution over the next output symbol. Stated differently, the joint network 230 generates, at each output step (e.g., time step), a probability distribution over possible speech recognition hypotheses. Here, the "possible speech recognition hypotheses" correspond to a set of output labels each representing a symbol/character in a specified natural language. For example, when the natural language is English, the set of output labels may include twenty-seven (27) symbols, e.g., one label for each of the 26-letters in the English alphabet and one label designating a space. Accordingly, the joint network 230 may output a set of values indicative of the likelihood of occurrence of each of a predetermined set of output labels. This set of values can be a vector and can indicate a probability distribution over the set of output labels. In some cases, the output labels are graphemes (e.g., individual characters, and potentially punctuation and other symbols), but the set of output labels is not so limited. For example, the set of output labels can include wordpieces, phonemes, and/or entire words, in addition to or instead of graphemes. The output distribution of the joint network 230 can include a posterior probability value for each of the different output labels. Thus, if there are 100 different output labels representing different graphemes or other symbols, the output $y_i$ of the joint network 230 can include 100 different probability values, one for each output label. The probability distribution can then be used to select and assign scores to candidate orthographic elements (e.g., graphemes, wordpieces, and/or words) in a beam search process (e.g., by the Softmax layer 240) for determining the transcription 120.

The Softmax layer 240 may employ any technique to select the output label/symbol with the highest probability in the distribution as the next output symbol predicted by the ASR model 200 at the corresponding output step. In this manner, the RNN-T model architecture of the ASR model 200 does not make a conditional independence assumption, rather the prediction of each symbol is conditioned not only on the acoustics but also on the sequence of labels output so far. The RNN-T model architecture of the ASR model 200 does assume an output symbol is independent of future acoustic frames 110, which allows the ASR model 200 to be employed in a streaming fashion.

In some examples, the encoder network (i.e., encoder) 210 of the ASR model 200 includes a stack of self-attention layers/blocks, such as conformer blocks. Here, each conformer block includes a series of multi-headed self-attention, depth wise convolution and feed-forward layers. The prediction network 220 may have two 2,048-dimensional LSTM layers, each of which is also followed by 640-dimensional projection layer. Alternatively, the prediction network 220 may include a stack of transformer or conformer blocks, or an embedding look-up table in lieu of LSTM layers. Finally, the joint network 230 may also have 640 hidden units. The Softmax layer 240 may be composed of a unified word piece or grapheme set that is generated using all unique word pieces or graphemes in a plurality of training data sets.

Figure 3A:
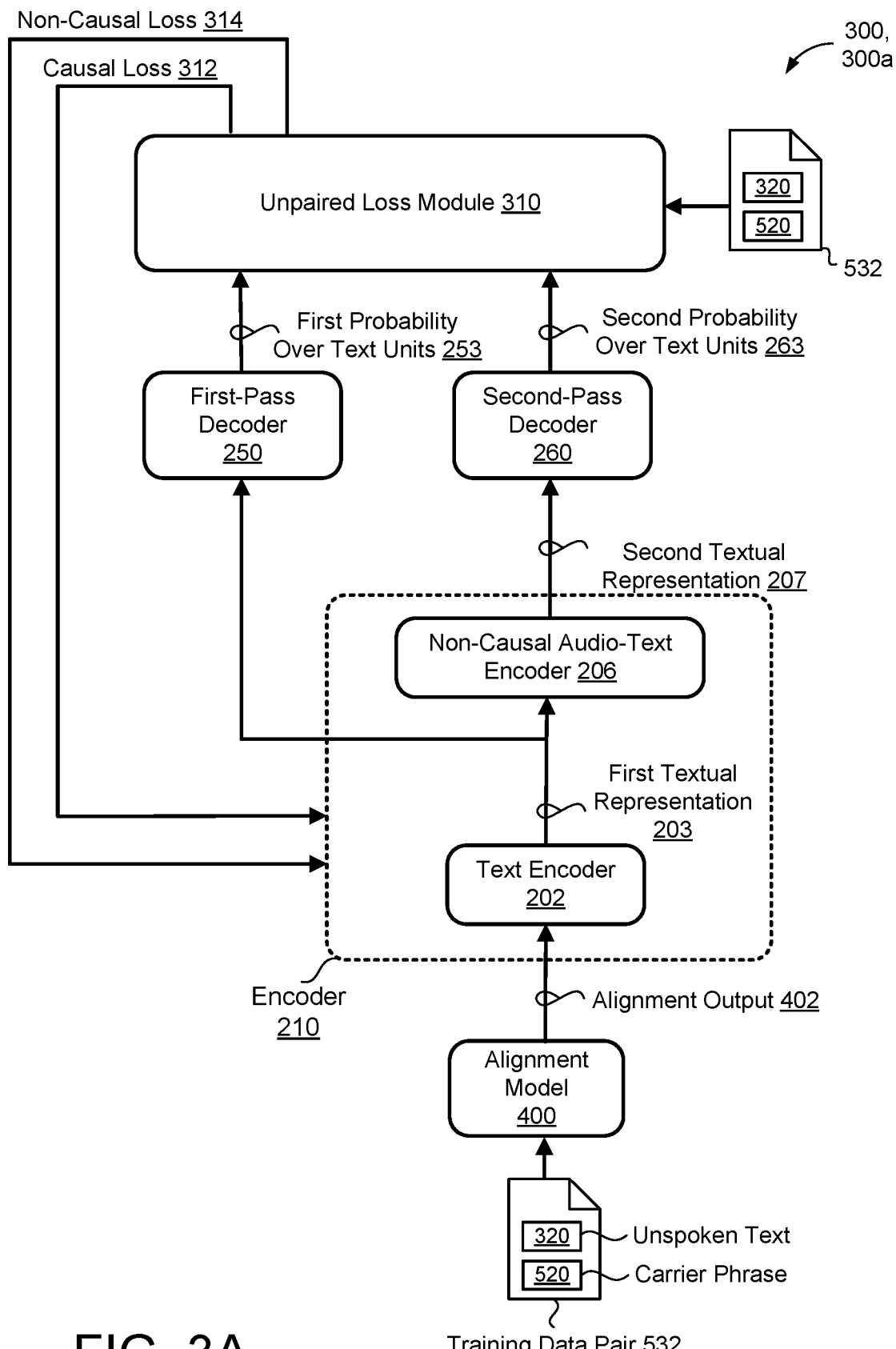
FIGS. 3A and 3B are schematic views of an example training process for training an encoder of the speech recognition model.
Figure 3B:
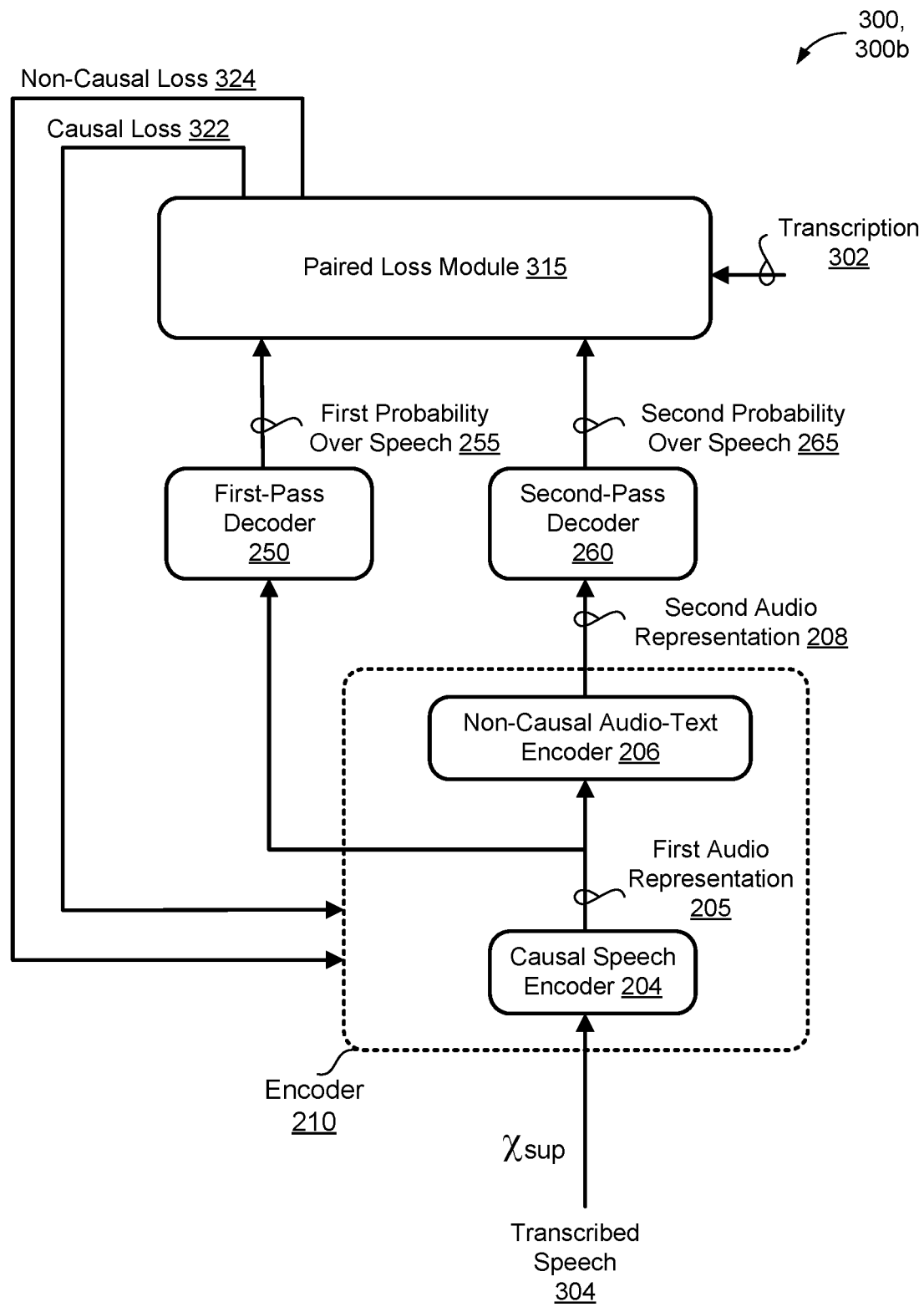

FIGS. 3A and 3B illustrate an example training process 300 for training the encoder 210 of the ASR model 200 (FIG. 2). The example training process 300 may be used to pre-train, train, and/or fine-tune the encoder 210. The training process 300 trains the encoder 210 using available training data that includes a set of training data pairs 532 (FIG. 3A) and/or a set of transcribed non-synthetic speech utterances ($X_{sup}$) 304 (FIG. 3B). Described in greater detail with reference to FIG. 4, each training data pair 532 in the set of training data pairs 532 includes a respective unspoken textual utterance 320 paired with a carrier phrase 520. On the other hand, each transcribed non-synthetic speech utterance 304 (also referred to as simply "transcribed speech utterance 304") is paired with a corresponding transcription 302 and is represented by a corresponding sequence of acoustic frames 110 (FIG. 1).

Figure 5:
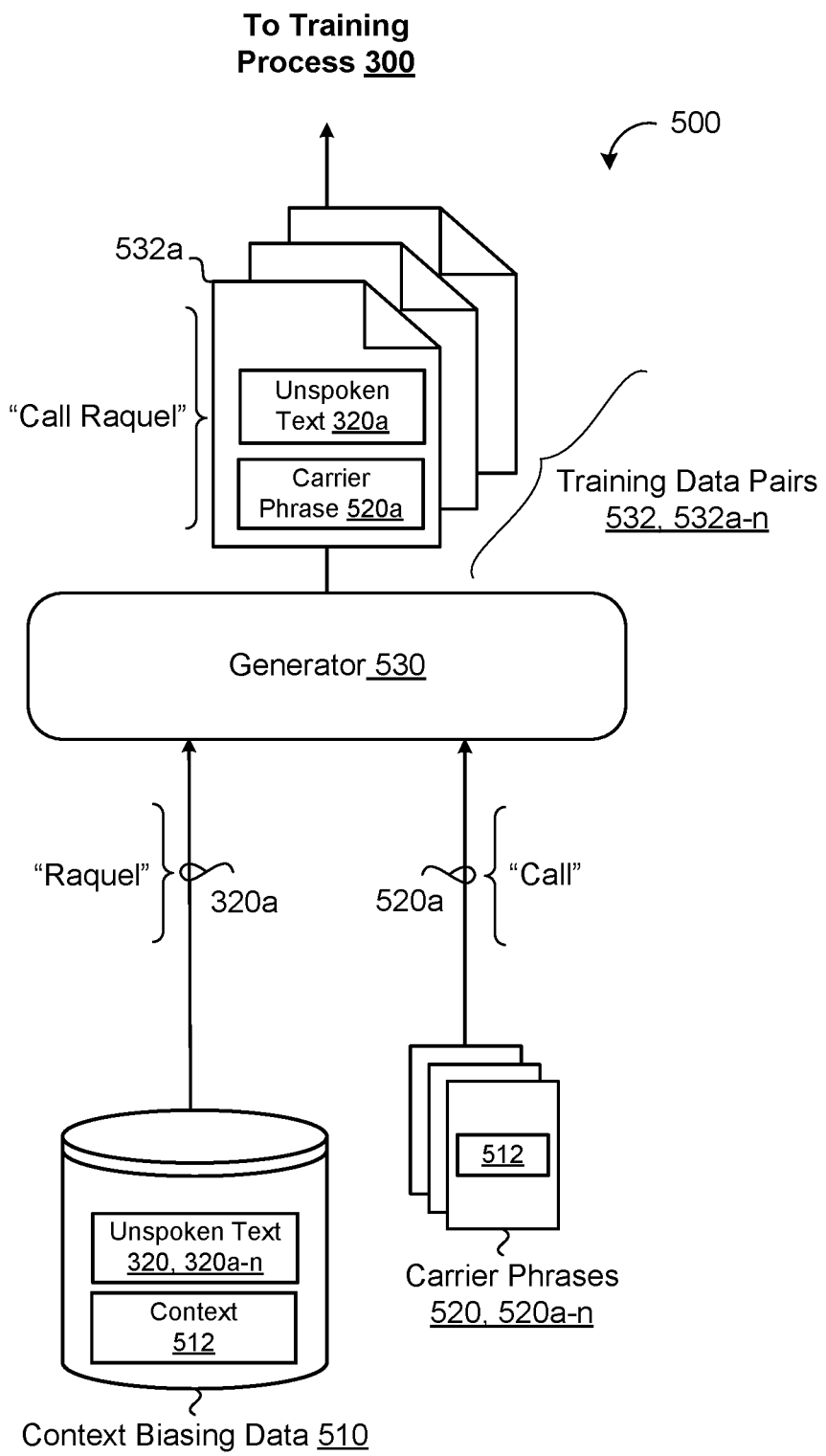
FIG. 5 is a schematic view of an example paired training data generation process for generating training data pairs.

Referring now to FIG. 5, a paired training data generation process 500 (also referred to as simply "generation process 500") is configured to generate a set of training data pairs 532, 532a-n using context biasing data 510 and a list of carrier phrases 520, 520a-n. The context biasing data 510 includes one or more sets of unspoken textual utterances 320 whereby each set of unspoken textual utterances 320 corresponds to a particular context 512. That is, each set of unspoken textual utterances 320 includes a plurality of unspoken textual utterances 320, 320a-n each corresponding to the particular context 512. Moreover, each unspoken textual utterance 320 includes text-only data (i.e., unpaired data) such that each unspoken textual utterance 320 is not paired with any corresponding spoken audio representation (i.e., speech) of the utterance. The unspoken textual utterance 320 may include any sequence text chunks including words, word-pieces, phonemes, and/or graphemes. The particular context 512 represents a characterization of each unspoken textual utterance 320 in the set of unspoken textual utterances 320. That is, the particular context 512 may include at least one of a song, a contact, an application, an entity, or a geographic location. For example, a first set of unspoken textual utterances 320 corresponding to the particular context 512 of "CONTACT" such that each unspoken textual utterance 320 in the first set of unspoken textual utterances 320 includes a respective contact name (e.g., Raquel, John, Phillip, etc.). In another example, a second set of unspoken textual utterances 320 corresponding to the particular context of "SONG" such each unspoken textual utterance in the first set of unspoken textual utterances 320 includes a respective song name. The example context biasing data 510 shown in FIG. 5, includes only a single set of unspoken textual utterances 320 corresponding to the single particular context 512 for the sake of clarity only, as it is understood that the context biasing data 510 may include any number of sets of unspoken textual utterances 320 each corresponding to a respective particular context 512.

Each carrier phrase 520 in the list of carrier phrases 520 includes text-only data (i.e., unpaired data) corresponding to actions or commands associated with the particular context 512. The list of carrier phrases 520 may include a textual representation of at least one command/action of directions to, call, message, play, or open. For example, a respective list of carrier phrases 520 associated with the particular context 512 of "CONTACT" may include call, text, email, etc. In this example, call, text, and email are each common spoken actions that precede contact names. In another example, a respective list of carrier phrases 520 associated with the particular context 512 of "SONG" may include play, stop, queue, etc. In short, each carrier phrase 520 is an action or command expected to be spoken in conjunction with the unspoken textual utterances 320 corresponding to the particular context 512. Stated differently, each carrier phrase 520 is an action or command expected spoken in relation to the set of unspoken textual utterances 320 and received by the ASR model (FIG. 2) during inference.

In some implementations, the sets of unspoken textual utterances 320 are obtained from text-only data sources such that no corresponding audio data exists for the unspoken textual utterances 320. For example, the generation process 500 may obtain unspoken textual utterances 320 corresponding to contact names for the particular context 512 of "CONTACT" from a United States Census data source that includes text-only data of names. Moreover, the generation process 500 may discard any unspoken textual utterances 320 that occur more than a threshold value in the data source. For instance, the generation process 500 may discard names that occur more than 20 times in the United States Census data source such that only unique contact names (i.e., contact names frequently included in training datasets) are included in the set of unspoken textual utterances 320. Advantageously, this enables the generation process 500 to generate training data pairs 532 that are underrepresented may be underrepresented in the transcribed speech utterances 304 (FIG. 3B).

With continued reference to FIG. 5, the generation process 500 employs a generator 530 that receives the set of unspoken textual utterances 320 corresponding to the particular context 512 and the list of carrier phrases 520 associated with the particular context 512 and generates the set of training data pairs 532. That is, the generator 530 may generate the set of training data pairs 532 by concatenating (i.e., pairing) each unspoken textual utterance 320 with a corresponding carrier phrase 520 from among the list of carrier phrases 520 into a single utterance. In some examples, the generator 530 generates the set of training data pairs by concatenating each unspoken textual utterance with multiple carrier phrases 520 from among the list of carrier phrases 520. In the example shown, the generator 530 generates a first training data pair 532a of "Call Raquel" by concatenating a first unspoken textual utterance 320a from the set of unspoken textual utterances 320 corresponding to the contact name of "Raquel" and a first carrier phrase 520a from among the list of carrier phrases 520 corresponding to the action/command of "Call." The generation process 500 outputs each training pair 532 of the set of training pairs 532 generated from the context biasing data 510 and the list of carrier phrases 520 to the training process 300 (FIGS. 3A and 3B). Thus, the training data pairs 532 generated by the generation process 500 represent utterances a user may speak in a particular context. For example, "Call Raquel" is an utterance a user may speak when the user is interfacing with a dialing application on the user device 10 whereby "Raquel" is one of the contacts associated with the user.

Referring back to FIGS. 3A and 3B, for simplicity, the training process 300 includes a semi-supervised loss part 300, 300a (FIG. 3A) and a supervised loss part 300, 300b (FIG. 3B). As will become apparent, the training process 300 trains the encoder 210 based on a total loss including unpaired loss terms 312, 314 derived by the semi-supervised loss part 300a using the training data pairs 532 and paired loss terms 322, 324 derived by the supervised loss part 300b using the transcribed speech utterances 304. As will become apparent, both the semi-supervised loss part 300a and the supervised loss part 300b derive losses when the encoder 210 operates in the streaming fashion (e.g., unpaired causal loss term 312 and paired causal loss term 322) and the non-streaming fashion (e.g., unpaired non-causal loss term 314 and the paired non-causal loss term 324). The training process 300 may jointly train the encoder 210 using any combination of the unpaired loss terms 312, 314 and the paired loss terms 322, 324. In some implementations, the training process 300 may employ an alignment model 400 that is configured to generate, at each of a plurality of output steps, alignment outputs (i.e., textual representation) 402 for each training data pair 532 (FIG. 3A) or each transcribed speech utterance 304 (FIG. 3B).

Figure 4:
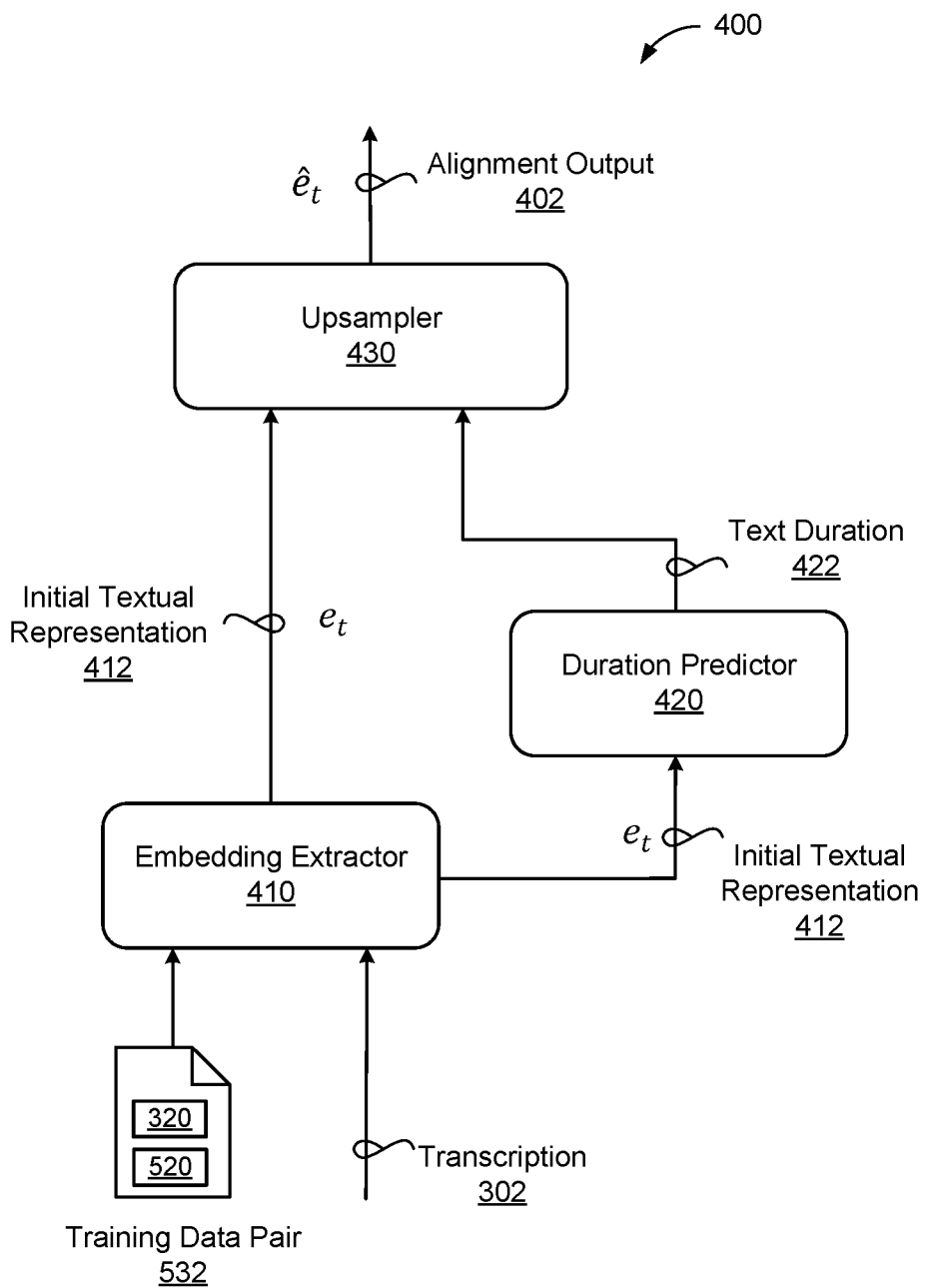
FIG. 4 is a schematic view of an example alignment model.

Referring now to FIG. 4, the alignment model 400 may include an embedding extractor 410, duration predictor 420, and an upsampler 430. In some implementations, the alignment model 400 is configured to tokenize each respective training data pair 532 (e.g., including a respective unspoken textual utterance 320 and a respective carrier phrase 520) into a corresponding sequence of sub-word units (e.g., alignment outputs) 402. In other implementations, the alignment model is configured to tokenize each respective transcription 302 into a corresponding alignment output 402 in addition to, or in lieu of, each training data pair 532. Each training data pair 532 and each transcription 302 may include a respective sequence of text chunks including words, wordpieces, phonemes, and/or graphemes.

Accordingly, in some instances, the embedding extractor 410 may receive a respective training data pair 532 and extract a corresponding initial textual representation ($e_t$) 412 therefrom. The initial textual representation 412 includes embedding lexical information from the unspoken textual utterance 320 and the carrier phrase 520 of the training data pair 532. Additionally or alternatively, the embedding extractor 410 may receive a transcription 302 corresponding to a transcribed speech utterance 304 (FIG. 3B) and extracts a corresponding initial textual representation 412 from the transcription 302.

The duration predictor 420 receives the initial textual representation 412 from the embedding extractor 410 and predicts a corresponding text chunk duration (i.e., word, word-piece, phoneme, and/or grapheme duration) 422. The text chunk duration 422 indicates a duration the corresponding text chunk would be spoken if a human (or text-to-speech system) spoke the training data pair 532 (or transcription 302). For example, the training data pair 532 may include a sequence of phonemes such that the duration predictor 420 predicts a phoneme duration 422 for each phoneme in the sequence of phonemes. In this example, the duration predictor 420 predicts the phoneme duration 422 by predicting a probability of non-zero duration for each phoneme and predicting a probability of continuous phoneme duration for each phoneme. As the sequence of phonemes includes regular phonemes, silences between word boundaries, and punctuation marks, only the regular phonemes are associated with non-zero duration while the silences and punctuation marks are generally associated with the continuous phoneme duration. Accordingly, the duration predictor 420 may use a sigmoid activation following a first one of two independent activations to predict the probability of non-zero duration and use a soft plus activation following a second one of the two independent projections to predict the continuous text chunk duration 422 for each text chunk. The duration predictor 420 determines, for each text chunk, whether the probability of non-zero duration is less than a threshold value, and when the probability of non-zero duration is less than the threshold value, a multiplier may zero-out the continuous text chunk duration 422 predicted by the softplus activation for the corresponding text chunk. Otherwise, when the probability of non-zero duration is not less than the threshold value, the predicted text chunk duration 422 may be set equal to the continuous phoneme duration predicted by the softplus activation.

The upsampler 430 receives the corresponding initial textual representation 412 generated for each training data pair 532 and each transcription 302, and the corresponding predicted text chunk duration 422 for each initial textual representation 412. Moreover, the upsampler generates an alignment output (e t) 402 having a number of frames by upsampling the initial textual representation 412 using the corresponding predicted text chunk duration 422. In some examples, the alignment model 400 sends the alignment output 402 to a text encoder 202 of the encoder 210 (FIGS. 3A and 3B). In other examples (not shown), the alignment model 400 sends the alignment output 402 directly to the non-causal audio-text encoder 206 of the encoder 210 (FIGS. 3A and 3B). In these other examples, the alignment output 402 serves as a first higher order textual feature representation 203 such that the non-causal audio-text encoder 206 may receive the alignment output 402 directly from the alignment model 400. In some additional examples, paired training data is available and the upsampler 430 generates the alignment output 402 as follows:

$$\hat{e}_t = \theta_{Refiner}(\text{Resample}(e_t, \text{Align}_{RNN-T}(e_s, t))) \quad (1)$$

Here, the upsampler includes resampler and refiner layers that align the initial textual embedding 412 to align with a corresponding encoded audio representation directly. In yet other examples, paired training data is not available and the upsampler 430 generates the alignment output 402 as follows:

$$\hat{e}_t = \theta_{Refiner}(\text{Resample}(e_t, \theta_{duration}(e_t))) \quad (2)$$

In particular, the number of frames of the alignment output 402 indicates a predicted speech duration of the training data pair 532 or the transcription 302. Stated differently, the number of frames of the alignment output 402 maps (i.e., aligns) the sequence of text chunks of the training data pair 532 to speech frames. Here, the upsampler 430 includes resampler and refiner layers that replicate the initial textual embedding 412 to match the predicted text chunk duration 422 (i.e., speech duration). As such, the alignment output 402 includes a textual representation of the training data pair 532 or the transcription 302 that has a timing component that aligns with how a human would speak the training data pair 532 or the transcription 302. In some examples, the alignment model 400 tokenizes the respective training data pair 532 into one or more alternative sequence of sub-word units whereby each alternate sequence of sub-word units includes at least one different sub-word unit in the alternate sequence of sub-word units than a corresponding sub-word unit 402 in the sequence of sub-word units 402.

Advantageously, the alignment model 400 includes a parameter-free duration model thereby greatly simplifying the training process 300 (FIGS. 3A and 3B). That is, instead of having parameters (e.g., neural network parameters) that are trained during training and consume memory and computational resources, the alignment model 400 is a parameter-free duration model saving memory and computational resources. In some implementations, the parameter-free alignment model 400 includes a fixed-repetition model. Here, the fixed-repetition model replicates each alignment output (e.g., sub-word unit) 402 a predetermined number of times. For instance, each alignment output 402 may include a predetermined repetition length of three (3), which corresponds to 180 milliseconds for each alignment output 402. Thus, in these instances, each alignment output 402 would have a speech duration corresponding to the predetermined repetition length, for example 180 milliseconds. In other implementations, the parameter-free alignment model 400 includes a random repetition model. Namely, the random repetition model replicates each alignment output 402 a random number of times. That is, the alignment model 400 may sample a respective repetition length from a distribution of repetition lengths for each respective alignment output 402, and apply the sampled repetition length to the respective alignment output 402. For example, a distribution of repetition lengths may include one repetition length (e.g., 60 milliseconds), two repetition lengths (e.g., 120 milliseconds), or three repetition lengths (e.g., 180 milliseconds). Continuing with the example, the alignment model 400 may sample a repetition length of one for a first alignment output 402 such that the first alignment output 402 has a speech duration of 60 milliseconds and sample a repetition length of three for a second alignment output 402 such that the second alignment output has a speech duration of 180 milliseconds. Using the distribution of repetition lengths, the alignment model 400 is able to better simulate the variability of spoken utterances in the alignment outputs 402.

In some examples, the parameter-free alignment model 400 includes a sub-word distribution model. In the sub-word distribution model, the alignment model 400 determines a distribution for each sub-word unit (e.g., alignment output 402). That is, for each transcribed speech utterance 304, the alignment model 400 generates forced-alignments using a baseline alignment model to estimate phoneme and word alignments for each word in the transcript from the transcribed speech utterance 304. The alignments are used to determine statistics of the number of frames corresponding to each phoneme or word in the transcribed speech utterances 304. As such, the alignment model 400 decomposes each word into its constituent word-pieces and evenly distributes a total number of frames amongst its constituent word-pieces. By accumulating statistics over all the transcribed speech utterances 304, the alignment model 400 determines a sufficient Gaussian distribution (e.g., including a mean and standard deviation) for each sub-word unit. As such, a duration for each sub-word unit may be derived by sampling from the corresponding Gaussian distribution or a Gaussian distribution that is sufficiently similar to the sub-word unit. Thus, the sub-word distribution model samples from Gaussian distribution models during inference to determine the alignment outputs 402. Notably, each unit is sampled independently agnostic to contextual effects because the sub-word distribution model is a parameter-free model.

In other examples, the parameter-free alignment model 400 includes an alignment sub-word distribution model. Here, the alignment model uses the text from the transcribed speech utterances 304 to augment the unpaired text data. In effect, this augmentation approach treats the text from the transcribed speech utterances 304 as unpaired text. Moreover, the alignment model up-samples the unpaired text data based on a ground-truth number of frames obtained using a forced-alignment. In particular, the alignment model 400 divides up a total number of frames from a word amongst constituent word-pieces. On the other hand, for unpaired text data, the alignment model 400 uses the sub-word distribution model to up-sample the text.

Thus, using any of the parameter-free duration models described above, the alignment model 400 upsamples a distribution of the sequence of sub-word units tokenized from the respective training data pair 532 (or transcription 302) and randomly masks a portion of the upsampled distribution of the sequence of sub-word units. Here, masking the upsampled distribution (e.g., setting portions of the sub-word unit to a null value) masks the alignment outputs 402 such that the alignment outputs 402 are sufficiently difficult for use in the training process 300. Thus, in any of the parameter-free duration models employed by the alignment model 400, the non-use of parameters greatly simplifies the training process 300 (FIGS. 3A and 3B).

Notably, in most instances, a text-to-speech (TTS) system generates an audible output to give the training data pairs 532 and the transcriptions 302 the timing component of human speech such that a training process may use the audible output (i.e., synthetic speech) to train the encoder 210. Thus, since alignment model 400 generates the alignment output 402 that maps the sequence of text chunks to speech frames directly, the training process 300 does not require any TTS system to train the encoder 210 using training data pairs 532 or the transcriptions 302. That is, the alignment model 400 does not convert the training data pairs 532 or transcriptions 302 to generate synthetic speech which, as discussed above, may not accurately model human speech for training speech recognition models.

Referring now to FIG. 3A, the semi-supervised loss part 300a of the training process 300 is configured to inject lexical information into the encoder 210 during training based on the unpaired causal loss term 312 and the unpaired non-causal loss term 314 each derived from the alignment outputs 402 output by the alignment model 400 and generated from the training data pairs 532. To that end, in some examples, the encoder 210 of the ASR model 200 (FIG. 2) includes a text encoder 202 and a non-causal audio-text encoder 206. The text encoder 202 is only used during the training process 300 and not during inference of the ASR model 200. The text encoder 202 may be a causal text encoder that does not receive any additional right-context (e.g., no additional frames of alignment output 402). In particular, the text encoder 202 is configured to receive alignment outputs 402 (i.e., text embeddings) from the alignment model 400 and generate, at each of a plurality of output steps, a first higher order textual feature representations 203 for a corresponding alignment output 402 (e.g., corresponding to a training data pair 532). That is, the text encoder 202 operates in a streaming fashion such that, at each output step, the text encoder 202 outputs the first higher order textual feature representations 203 as soon as they are generated. Thus, the first higher order textual feature representations 203 may correspond to a portion of the alignment output 402 or an entirety of the alignment output 402.

The semi-supervised loss part 300a of the training process 300 employs a first-pass decoder (i.e., first decoder) 250 of the ASR model 200 (FIG. 2) configured to receive, as input, the first higher order textual feature representations 203 output from the text encoder 202 at each of the plurality of output steps and generate, as output, a first probability distribution 253 over possible text units for a corresponding first higher order textual feature representation 203. Here, each text unit from the first probability distribution 253 may include a wordpiece. In some implementations, the first-pass decoder 250 includes a RNN-T architecture. The first-pass decoder 250 may include a phoneme decoder configured to decode a sequence of phonemes, a wordpiece decoder configured to decode a sequence of word pieces, and/or a grapheme decoder configured to decode a sequence of graphemes. In some examples, the first probability distribution 253 over possible text units includes one of possible text labels, possible phoneme labels, possible wordpiece labels, or possible grapheme labels. An unpaired loss module 310 is configured to determine the unpaired causal loss term 312 based on the first probability distribution 253 over possible text units and the corresponding training data pair 532. The unpaired causal loss term 312 may be represented by $\mathcal{L}_c(y_t, x_t)$ where $y_t$ represents the first probability distribution 253 over possible text units and $x_t$ represents the training data pair 532. Here, the corresponding training data pair 532 in which the first probability distribution 253 over possible text units is generated from, serves as a ground-truth transcription when determining the unpaired causal loss term 312 for the corresponding training data pair 532.

With continued reference to FIG. 3A, the encoder 210 includes the non-causal audio-text encoder 206 configured to generate a second higher order textual feature representation 207 for a corresponding first higher order textual feature representation 203. As will become apparent, the non-causal audio-text encoder 206 generates higher order feature representations for text and audio encodings such that the training process 300 trains the encoder 210 using shared latent representations including speech and text modalities. The non-causal audio-text encoder 206 may include one of a plurality of unidirectional long short-term memory (LSTM) layers, a plurality of conformer layers, or a plurality of transformer layers. Notably, the non-causal audio-text encoder 206 operates in a non-streaming fashion such that the non-causal audio-text encoder 206 processes additional right context to generate the second higher order textual feature representations 207. That is, in contrast to the text encoder 202, the non-causal audio-text encoder 206 receives additional right context (e.g., additional frames of the alignment output 402) and generates the second higher order textual feature representation 207 by processing the additional right context. In some examples, the non-causal audio-text encoder 206 generates the second higher order textual feature representation 207 without receiving any alignment outputs 402 or audio data as input. In these examples, the non-causal audio-text encoder 206 only receives the first higher order textual feature representation 203 generated by the text encoder 202 at each of the plurality of output steps whereby the first higher order textual feature representations 203 represent the additional right context (e.g., 900 ms of additional right context frames). Accordingly, by processing the first higher order textual feature representation 203 corresponding to additional right context, the non-causal audio-text encoder 206 generates the second higher order textual feature representation 207 with more accuracy, but at the cost of increased latency.

The semi-supervised loss part 300a of the training process 300 includes the second-pass decoder (i.e., second decoder) 260 of the ASR model 200 (FIG. 2) configured to receive, as input, the second higher order textual feature representations 207 output by the non-causal audio-text encoder 206 and generate, as output, a second probability distribution 263 over possible text units for a corresponding second higher order textual feature representation 207. Here, each text unit from the first probability distribution 253 may include a wordpiece. In some examples, the first-pass decoder 250 and the second-pass decoder are the same decoder. In some implementations, the second-pass decoder 260 includes a RNN-T architecture. Thus, each of the first-pass decoder 250 and the second-pass decoder 260 may include a prediction network configured to receive, as input, a sequence of N previous non-blank symbols output by a final Softmax layer and generate a dense representation at each of the plurality of output steps. Moreover, each of the first-pass decoder 250 and the second-pass decoder 260 may include a joint network (e.g., joint network 230 (FIG. 2)) configured to receive, as input, the higher order textual feature representation 203, 207 generated by the encoder 210 and the dense representation generated by the prediction network at each of the plurality of output steps and generate a probability distribution 253, 263 over possible text units.

The second-pass decoder 260 may include a phoneme decoder configured to decode a sequence of phonemes, a wordpiece decoder configured to decode a sequence of word pieces, and/or a grapheme decoder configured to decode a sequence of graphemes. In some examples, the first probability distribution 253 over possible text units includes one of possible text labels, possible phoneme labels, possible wordpiece labels, or possible grapheme labels. Thus, the unpaired loss module 310 is further configured to determine the unpaired non-causal loss term 314 based on the second probability distribution 263 over possible text units and the corresponding training data pair 532. The unpaired causal loss term 312 may be represented by $\mathcal{L}_{NC}(y_t, x_t)$ where $y_t$ represents the second probability distribution 263 over possible text units and $x_t$ represents the training data pair 532.

Here, the corresponding training data pair 532 in which the second probability distribution 263 over possible text units was generated from, serves as a ground-truth transcription for determining the unpaired non-causal loss term 314 for the corresponding training data pair 532.

Thus, the semi-supervised loss part 300a of the training process 300 trains the encoder 210 of the ASR model 200 (FIG. 2) based on the unpaired loss terms 312, 314 derived from the training data pair 532. Training the encoder 210 may include updating parameters of the text encoder 202 and/or the non-causal audio-text encoder 206 based on the unpaired loss terms 312, 314. Notably, the unpaired causal loss term 312 indicates a loss when the encoder 210 operates in the streaming fashion for the training data pairs 532 and the unpaired non-causal loss term 314 indicates a loss when the encoder 210 operates in the non-streaming fashion for the training data pairs 532. As such, the encoder 210 is jointly trained on the unpaired losses 312, 314 when the encoder 210 operates in the streaming and non-streaming modes.

Referring now to FIG. 3B, the supervised loss part 300b of the training process 300 is configured to inject lexical information into the encoder 210 during training based on an paired causal loss term 322 and a paired non-causal loss term 324 each derived from a corresponding transcribed speech utterance 304. In some examples, the encoder 210 includes a causal speech encoder 204 and the non-causal audio-text encoder 206 in addition to, or in lieu of, the text encoder 202 (FIG. 3A). In some examples, the causal speech encoder 204 includes one of a plurality of unidirectional long short-term memory (LSTM) layers, a plurality of conformer layers, or a plurality of transformer layers. In these examples, the causal speech encoder 204 may include an initial stack of conformer layers and the non-causal audio-text encoder includes a final stack of conformer layers overlain on the initial stack of conformer layers. The causal speech encoder 204 does not receive any additional right context (e.g., no additional frames of the transcribed speech utterance 304). In particular, the causal speech encoder 204 is configured to receive the transcribed speech utterances 304 and generate, at each of the plurality of output steps, a first higher order audio feature representation 205. That is, the causal speech encoder 204 operates in a streaming fashion such that, at each output step, the causal speech encoder 204 outputs the first higher order audio feature representations 205 as soon as they are generated. As such, the first higher order audio feature representation 205 may correspond to a portion of the transcribed speech utterance 304 or an entirety of the transcribed speech utterance 304.

The supervised loss part 300b of the training process 300 employs the first-pass decoder 250 and the second-pass decoder 260. The first-pass decoder 250 is configured to receive, as input, the first higher order audio feature representation 205 output from the causal speech encoder 204 at each of the plurality output steps and generate, as output, a first probability distribution 255 over possible speech recognition hypotheses. In some implementations, the first-pass decoder 250 includes a RNN-T architecture. The first-pass decoder 250 may include a phoneme decoder configured to decode a sequence of phonemes, a wordpiece decoder configured to decode a sequence of word pieces, and/or a grapheme decoder configured to decode a sequence of graphemes. In some examples, the first probability distribution 255 over possible speech recognition hypotheses includes one of possible phoneme labels, possible wordpiece labels, or possible grapheme labels. Thereafter, a paired loss module 315 is configured to determine the paired causal loss term 322 based on the first probability distribution 255 over possible speech recognition hypotheses and the transcription 302 for the corresponding transcribed speech utterance 304. The paired causal loss term 322 may be represented by $\mathcal{L}_C(y_s, x_s)$ where $y_s$ represents the first probability distribution 255 over possible speech recognition hypotheses and $x_s$ represents transcribed speech utterance 304. Here, the transcription 302 paired with the corresponding transcribed speech utterance 304 in which the first probability distribution 255 over possible speech recognition hypotheses is generated from serves as a ground-truth transcription when determining the paired causal loss term 322 for the corresponding transcribed speech utterance 304.

With continued reference to FIG. 3B, the encoder 210 includes the non-causal audio-text encoder 206 configured to generate a second higher order audio feature representation 208 for a corresponding first higher order audio feature representation 205. That is, in contrast to the causal speech encoder 204, the non-causal audio-text encoder 206 receives additional right context (e.g., additional acoustic frames corresponding to the transcribed speech utterance 304) and generates the second higher order textual feature representation 207 by processing the additional right context. In some examples, the non-causal audio-text encoder 206 generates the second higher order audio feature representation 208 without receiving any additional transcribed speech utterances 304 or future acoustic frames. In these examples, the non-causal audio-text encoder 206 only receives the first higher order audio feature representation 205 generated by the causal speech encoder 204 at each of the plurality of output steps whereby the first higher order audio feature representations 205 represent the additional right context (e.g., 900 ms of additional right context frames). Accordingly, by processing the first higher order audio feature representation 205 corresponding to additional right context, the non-causal audio-text encoder 206 generates the second higher order audio feature representation 208 with more accuracy, but at the cost of increased latency.

The supervised loss part 300b of the training process 300 includes the second-pass decoder 260 of the ASR model 200 (FIG. 2) configured to receive, as input, the second higher order audio feature representations 208 output by the non-causal audio-text encoder 206 and generate, as output, a second probability distribution 265 over possible speech recognition hypotheses for a corresponding second higher order audio feature representation 208. In some implementations, the second-pass decoder 260 includes a RNN-T architecture. The second-pass decoder 260 may include a phoneme decoder configured to decode a sequence of phonemes, a wordpiece decoder configured to decode a sequence of word pieces, and/or a grapheme decoder configured to decode a sequence of graphemes. In some examples, the second probability distribution 265 over possible speech recognition hypotheses includes one of possible phoneme labels, possible wordpiece labels, or possible grapheme labels. Thus, the paired loss module 310 is further configured to determine the paired non-causal loss term 324 based on the second probability distribution 265 over possible speech recognition hypotheses and the transcription 302 of the corresponding transcribed speech utterance 304. The paired non-causal loss term 324 may be represented by $\mathcal{L}_{NC}(y_s, x_s)$ where $y_s$ represents the second probability distribution 265 over possible speech recognition hypotheses and $x_t$ represents the transcribed speech utterance 304. Here, the transcription 302 of the corresponding transcribed speech utterance 304 from which second probability distribution 265 over possible speech recognition hypotheses was generated from, serves as a ground-truth transcription when determining the paired non-causal loss term 324 for the corresponding transcribed speech utterance 304.

Thus, the supervised loss part 300b of the training process 300 trains the encoder 210 of the ASR model 200 (FIG. 2) based on the paired loss terms 322, 324 derived from the transcribed speech utterances 304. Training the encoder 210 may include updating parameters of the causal speech encoder 204 and/or the non-causal audio-text encoder 206 based on the paired loss terms 322, 324. In some examples, the training process 300 trains the causal speech encoder 204 and the non-causal audio-text encoder 206 using Hybrid Autoregressive Transducer Factorization. Notably, the paired causal loss term 322 indicates a loss when the encoder 210 operates in the streaming fashion for transcribed speech utterances 304 and the paired non-causal loss term 324 indicates a loss when the encoder 210 operates in the non-streaming fashion for the transcribed speech utterances 304. As such, the encoder 210 is jointly trained on the paired losses 322, 324 when the encoder 210 operates in the streaming and non-streaming modes.

Implementations described above describe the training process 300 training the encoder 210 of the ASR model 200, however, it is understood that the training process 300 may also be employed to train/pre-train a monolingual ASR model 200 or a multilingual ASR model 200. In some instances, the training process 300 may be employed to train end-to-end ASR models with decoder structures (i.e., non-pre-training) or fine-tune an ASR model to perform downstream tasks such as speech translation or natural language understanding. Moreover, the training process 300 may be used with any training data training data pairs 532 and transcribed speech utterances 304, independently, or using some combination thereof.

Referring back to FIG. 2, during inference (e.g., after the training process 300 (FIGS. 3A and 3B train the ASR model 200), the ASR model 200 discards the text encoder 202 such that the ASR model 200 does not significantly increase a number of model parameters or computational costs during inference. Moreover, the Softmax layer 240 may optionally include a contextual finite state transducer (FST) 242 configured to bias the beam-search decoding process of the Softmax layer 240. That is, the Softmax layer 240 selects a possible speech recognition hypothesis having a highest corresponding probability from the probability distribution generated by the joint network 230 as the transcription 120 (FIG. 1). The contextual FST 242 biases the beam-search decoding process by determining a context score 244 for each possible speech recognition hypothesis based on context data. In particular, context data may correspond to a particular state of the user device 10 (FIG. 1) whereby the context data includes one or more biasing phrases. For example, the contextual FST 242 may obtain biasing phrases including contact names from a contact application associated with a user 104 of the user device 10 (FIG. 1) when the user device 10 displays a dialing application. Thus, in this example, the contextual FST 242 determines context scores 244 for each possible speech recognition hypothesis based on whether the speech recognition hypothesis is included in the list of biasing phrases (e.g., based on whether the speech recognition hypothesis is one of the contact names obtained from the contact application). Continuing with the example, the Softmax layer 240 selects the possible candidate hypothesis as the transcription 120 based on the context scores 244 generated by the contextual FST 242 and the probability distribution.

Figure 6:
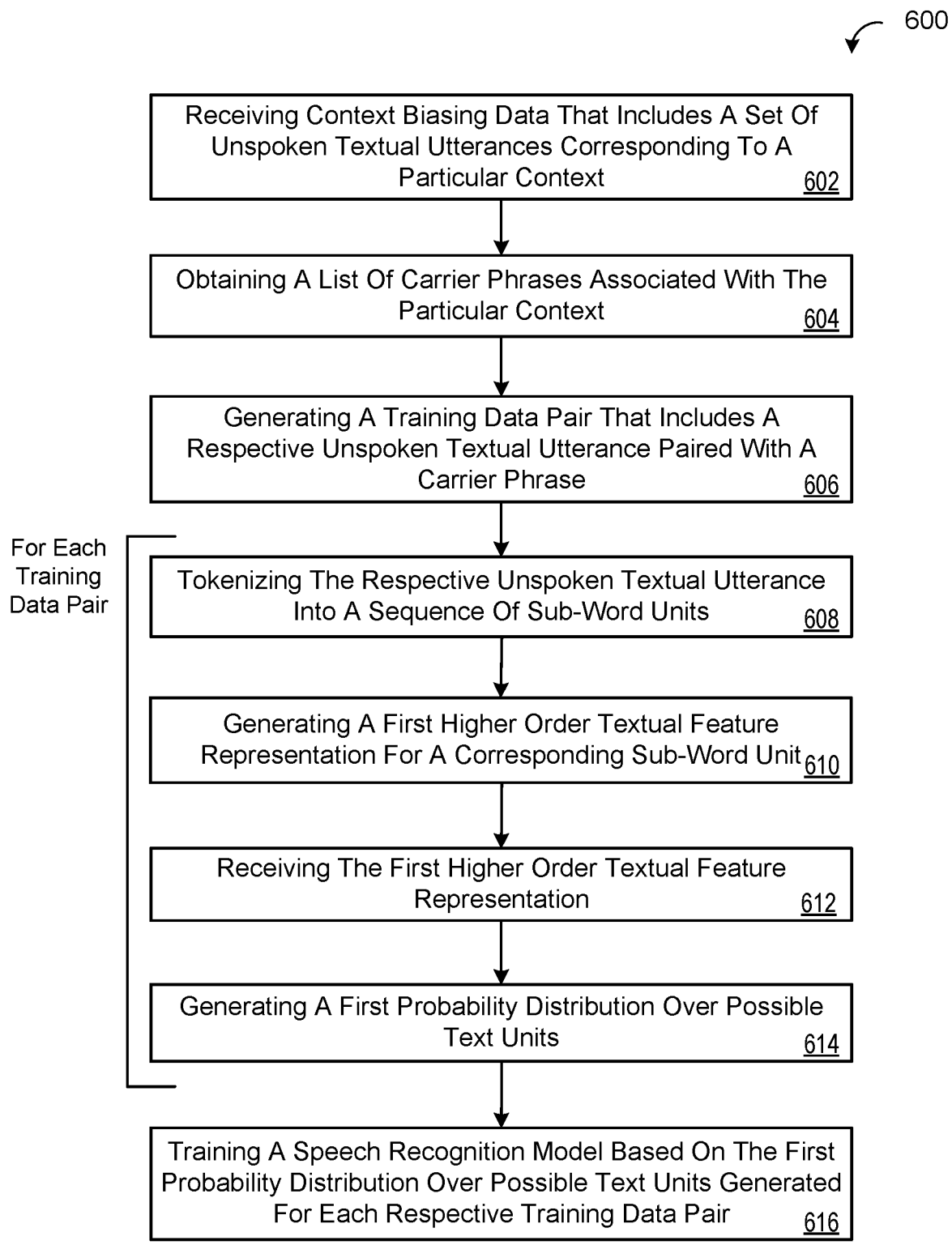
FIG. 6 is a flowchart of an example arrangement of operations for a computer-implemented method of training a speech recognition model using contextual biasing with text injection.
Figure 7:
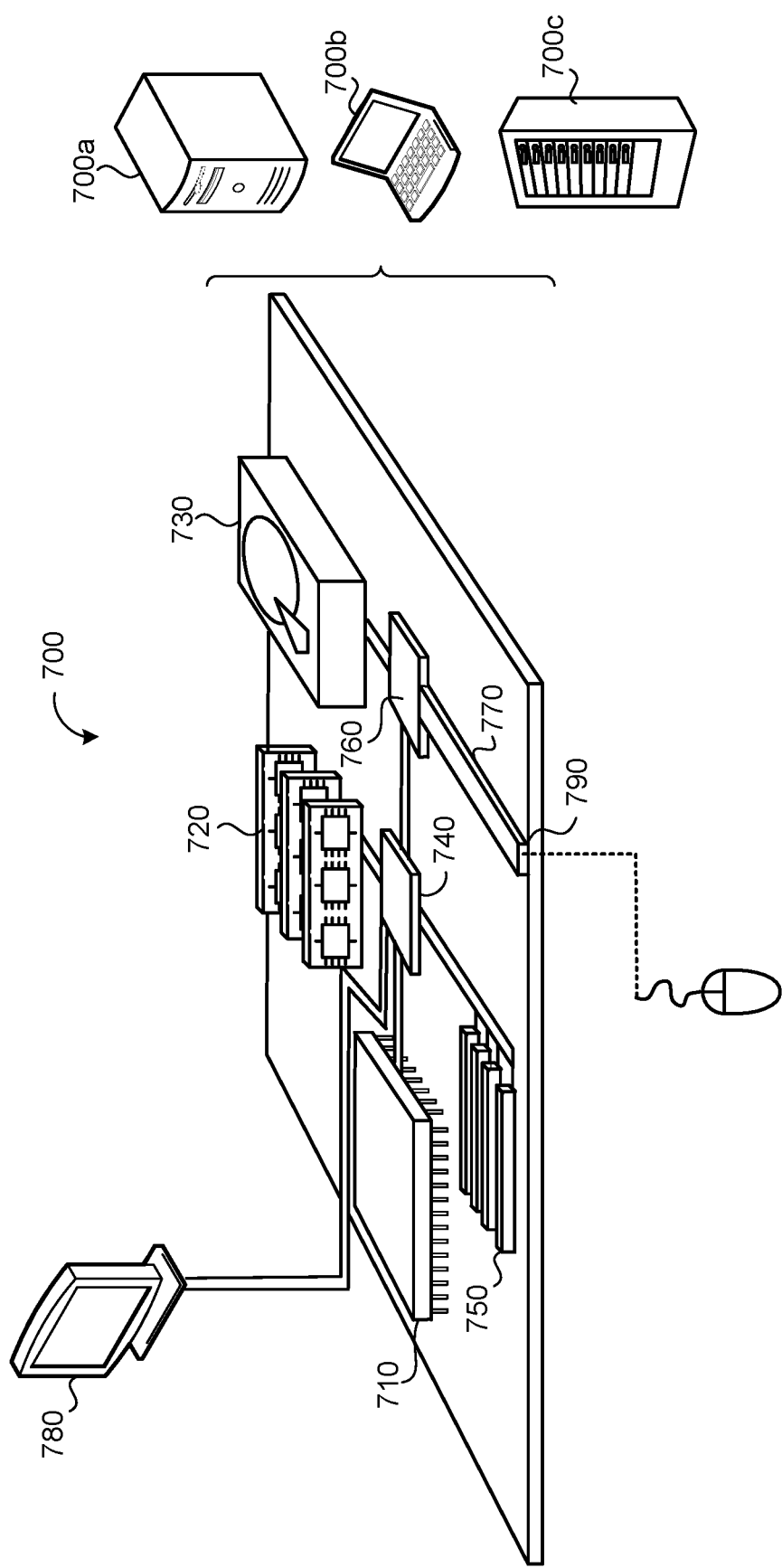
FIG. 7 is a schematic view of an example computing device that may be used to implement the systems and methods described herein.

FIG. 6 is a flowchart of an example arrangement of operations for a computer-implemented method 600 of training a speech recognition model using contextual biasing with text injection. The method 600 may execute on data processing hardware 710 (FIG. 7) using instructions stored on memory hardware 720 (FIG. 7). The data processing hardware 710 and the memory hardware 720 may reside on the user device 10 and/or remote computing device 60 of FIG. 1 corresponding to a computing device 700 (FIG. 7).

At operation 602, the method 600 includes receiving context biasing data 510 that includes a set of unspoken textual utterances 320 corresponding to a particular context 512. Each unspoken textual utterance 320 in the set of unspoken textual utterances 320 is not paired with any corresponding spoken utterance of speech. At operation 604, the method 600 includes obtaining a list of carrier phrases 520 associated with the particular context 512 of the set of unspoken textual utterances 320. At operation 606, the method 600 includes generating, for each respective unspoken textual utterance 320 in the set of unspoken textual utterances 320, a corresponding training data pair 532 that includes the respective unspoken textual utterance 320 paired with a carrier phrase 520 from among the list of carrier phrases 520.

For each respective training data pair 532, the method 600 performs operations 608-614. At operation 608, the method 600 includes tokenizing the respective training data pair 532 into a sequence of sub-word units (e.g., alignment outputs) 402. At operation 610, the method 600 includes generating a first higher order textual feature representation 203 for a corresponding sub-word unit 402 in the sequence of sub-word units 402 tokenized from the respective training data pair 532. More specifically, a text encoder 202 of an ASR model 200 generates the first higher order textual feature representation 203 at each of a plurality of output steps. At operation 612, the method 600 includes receiving the first higher order textual feature representation 203 generated by the text encoder 202 at each of the plurality of output steps as input to a first decoder 250 of the ASR model 200. At operation 614, the method 600 includes generating a first probability distribution 253 over possible text units using the first decoder 250 at each of the plurality of output steps. At operation 616, the method 600 includes training the ASR model 200 based on the first probability distribution 253 over possible text units generated by the first decoder 250 at each of the plurality of output steps for each respective training data pair 532.

FIG. 7 is a schematic view of an example computing device 700 that may be used to implement the systems and methods described in this document. The computing device 700 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 700 includes a processor 710, memory 720, a storage device 730, a high-speed interface/controller 740 connecting to the memory 720 and high-speed expansion ports 650, and a low speed interface/controller 760 connecting to a low speed bus 770 and a storage device 730. Each of the components 710, 720, 730, 740, 750, and 760, are interconnected using various busses, and may be mounted on a common motherboard or in other manners as appropriate. The processor 710 can process instructions for execution within the computing device 700, including instructions stored in the memory 720 or on the storage device 730 to display graphical information for a graphical user interface (GUI) on an external input/output device, such as display 780 coupled to high speed interface 740. In other implementations, multiple processors and/or multiple buses may be used, as appropriate, along with multiple memories and types of memory. Also, multiple computing devices 700 may be connected, with each device providing portions of the necessary operations (e.g., as a server bank, a group of blade servers, or a multi-processor system).

The memory 720 stores information non-transitorily within the computing device 700. The memory 720 may be a computer-readable medium, a volatile memory unit(s), or non-volatile memory unit(s). The non-transitory memory 720 may be physical devices used to store programs (e.g., sequences of instructions) or data (e.g., program state information) on a temporary or permanent basis for use by the computing device 700. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 730 is capable of providing mass storage for the computing device 700. In some implementations, the storage device 730 is a computer-readable medium. In various different implementations, the storage device 730 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 720, the storage device 730, or memory on processor 710.

The high speed controller 740 manages bandwidth-intensive operations for the computing device 700, while the low speed controller 760 manages lower bandwidth-intensive operations. Such allocation of duties is exemplary only. In some implementations, the high-speed controller 740 is coupled to the memory 720, the display 780 (e.g., through a graphics processor or accelerator), and to the high-speed expansion ports 750, which may accept various expansion cards (not shown). In some implementations, the low-speed controller 760 is coupled to the storage device 730 and a low-speed expansion port 790. The low-speed expansion port 790, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 700*a* or multiple times in a group of such servers 700*a*, as a laptop computer 700*b*, or as part of a rack server system 700*c*.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method when executed on data processing hardware causes the data processing hardware to perform operations comprising:
    receiving context biasing data, the context biasing data comprising a set of unspoken textual utterances corresponding to a particular context, each unspoken textual utterance in the set of unspoken textual utterances not paired with any corresponding spoken utterance of speech;
    obtaining a list of carrier phrases associated with the particular context of the set of unspoken textual utterances;
    for each respective unspoken textual utterance in the set of unspoken textual utterances, generating a corresponding training data pair comprising the respective unspoken textual utterance paired with a carrier phrase from among the list of carrier phrases;
    for each respective training data pair:
        tokenizing the respective training data pair into a sequence of sub-word units;
        generating, by a text encoder, at each of a plurality of output steps, a first higher order textual feature representation for a corresponding sub-word unit in the sequence of sub-word units tokenized from the respective training data pair;
        receiving, as input to a first decoder of a speech recognition model, the first higher order textual feature representation generated by the text encoder at each of the plurality of output steps; and
        generating, by the first decoder, at each of the plurality of output steps, a first probability distribution over possible text units; and
    training the speech recognition model based on the first probability distribution over possible text units generated by the first decoder at each of the plurality of output steps for each respective training data pair.

2. The computer-implemented method of claim 1, wherein the particular context comprises at least one of:
    a song;
    a contact;
    an application;
    an entity; or
    a geographic location.

3. The computer-implemented method of claim 1, wherein the list of carrier phrases comprises at least one of:
    call;
    message;
    play;
    open; or
    directions to.

4. The computer-implemented method of claim 1, wherein the operations further comprise:
    tokenizing the respective training data pair into one or more alternate sequences of sub-word units, each alternate sequence of sub-word units comprising at least one different sub-word unit in the alternate sequence of sub-word units than a corresponding sub-word unit in the sequence of sub-word units,
    wherein the respective training data pair comprises the sequence of sub-word units and the one or more alternate sequence of sub-word units.

5. The computer-implemented method of claim 1, wherein the operations further comprise, for each unspoken textual utterance in the set of unspoken textual utterances:
    receiving, as input to a shared audio-text encoder of the speech recognition model, the first higher order textual feature representation generated by the text encoder at each of the plurality of output steps;
    generating, by the shared audio-text encoder, at each of the plurality of output steps, a second higher order textual feature representation for a corresponding first higher order textual feature representation in a shared latent representation space;
    receiving, as input to a second decoder of the speech recognition model, the second higher order textual feature representation generated by the shared audio-text encoder at each of the plurality of output steps; and
    generating, by the second decoder, at each of the plurality of output steps, a second probability distribution over possible text units,
    wherein training the speech recognition model is further based on the second probability distribution over possible text units generated by the second decoder at each of the plurality of output steps for each unspoken textual utterance in the set of unspoken textual utterances.

6. The computer-implemented method of claim 5, wherein the operations further comprise:
    receiving a set of transcribed speech utterances, each transcribed speech utterance in the set of transcribed speech utterances paired with a corresponding transcription and represented by a corresponding sequence of acoustic frames; and
    for each transcribed speech utterance in the set of transcribed speech utterances:
        generating, by an audio encoder of the speech recognition model, at each of a plurality of output steps, a first higher order audio feature representation for a corresponding acoustic frame in the sequence of acoustic frames representing the transcribed speech utterance;
        receiving, as input to the first decoder of the speech recognition model, the first higher order audio feature representation generated by the audio encoder at each of the plurality of output steps; and
        generating, by the first decoder, at each of the plurality of output steps, a first probability distribution over possible speech recognition hypotheses,
    wherein training the speech recognition model is further based on the first probability distribution over possible speech recognition hypotheses generated by the first decoder at each of the plurality of output steps for each transcribed speech utterance in the set of transcribed speech utterances.

7. The computer-implemented method of claim 6, wherein the operations further comprise, for each transcribed speech utterance in the set of transcribed speech utterances:

receiving, as input to the shared audio-text encoder of the speech recognition model, the first higher order audio feature representation generated by the audio encoder at each of the plurality of output steps;

generating, by the shared audio-text encoder, at each of the plurality of output steps, a second higher order audio feature representation for a corresponding first higher order audio feature representation in the shared latent representation space;

receiving, as input to the second decoder of the speech recognition model, the second higher order audio feature representation generated by the shared audio-text encoder at each of the plurality of output steps; and generating, by the second decoder, at each of the plurality of output steps, a second probability distribution over possible speech recognition hypotheses, wherein training the speech recognition model is further based on the second probability distribution over possible speech recognition hypotheses generated by the second decoder at each of the plurality of output steps for each transcribed speech utterance in the set of transcribed speech utterances.

8. The computer-implemented method of claim 7, wherein training the speech recognition model comprises jointly training the speech recognition model using the first and second probability distributions over possible text units and the first and second probability distributions over possible speech recognition hypotheses.

9. The computer-implemented method of claim 7, wherein the operations further comprise:

receiving, at a contextual finite-state transducer (FST), the second probability distribution over possible speech recognition hypotheses;

determining, using the contextual FST, context scores for each possible speech recognition hypotheses of the second probability distribution based on context data; and executing a beam search decoding process to select a respective one of the possible speech recognition hypotheses of the second probability distribution based on the context scores and the second probability distribution.

10. The computer-implemented method of claim 1, wherein the first decoder comprises:

a prediction network configured to:
 receive, as input, a sequence of N previous non-blank symbols output by a final Softmax layer; and
 generate, at each of the plurality of output steps, a dense representation; and a joint network configured to:
 receive, as input, the first higher order textual feature representation generated by the text encoder at each of the plurality of output steps and the dense representation generated by the prediction network at each of the plurality of output steps; and
 generate, at each of the plurality of output steps, the first probability distribution over possible text units.

11. The computer-implemented method of claim 1, wherein the operations further comprise, for each respective training data pair:

upsampling, using a parameter-free duration model, a distribution of the sequence of sub-word units tokenized from the respective training data pair; and randomly masking a portion of the upsampled distribution of the sequence of sub-word units.

12. The computer-implemented method of claim 1, wherein:

each sub-word unit in the sequence of sub-word units comprises one of a phoneme or a wordpiece; and each text unit in the first probability distribution over possible text units comprises a wordpiece.

13. A system comprising:

data processing hardware; and memory hardware in communication with the data processing hardware, the memory hardware storing instructions that when executed on the data processing hardware cause the data processing hardware to perform operations comprising:

receiving context biasing data, the context biasing data comprising a set of unspoken textual utterances corresponding to a particular context, each unspoken textual utterance in the set of unspoken textual utterances not paired with any corresponding spoken utterance of speech;

obtaining a list of carrier phrases associated with the particular context of the set of unspoken textual utterances;

for each respective unspoken textual utterance in the set of unspoken textual utterances, generating a corresponding training data pair comprising the respective unspoken textual utterance paired with a carrier phrase from among the list of carrier phrases;

for each respective training data pair:
 tokenizing the respective training data pair into a sequence of sub-word units;
 generating, by a text encoder, at each of a plurality of output steps, a first higher order textual feature representation for a corresponding sub-word unit in the sequence of sub-word units tokenized from the respective training data pair;
 receiving, as input to a first decoder of a speech recognition model, the first higher order textual feature representation generated by the text encoder at each of the plurality of output steps; and
 generating, by the first decoder, at each of the plurality of output steps, a first probability distribution over possible text units; and training the speech recognition model based on the first probability distribution over possible text units generated by the first decoder at each of the plurality of output steps for each respective training data pair.

14. The system of claim 13, wherein the particular context comprises at least one of:

a song;
a contact;
an application;
an entity; or
geographic location.

15. The system of claim 13, wherein the list of carrier phrases comprises at least one of:

call;
message;
play;
open; or
directions to.

16. The system of claim 13, wherein the operations further comprise:

tokenizing the respective training data pair into one or more alternate sequences of sub-word units, each alternate sequence of sub-word units comprising at least one different sub-word unit in the alternate sequence of sub-word units than a corresponding sub-word unit in the sequence of sub-word units, wherein the respective training data pair comprises the sequence of sub-word units and the one or more alternate sequence of sub-word units.

17. The system of claim 13, wherein the operations further comprise, for each unspoken textual utterance in the set of unspoken textual utterances:
receiving, as input to a shared audio-text encoder of the speech recognition model, the first higher order textual feature representation generated by the text encoder at each of the plurality of output steps;
generating, by the shared audio-text encoder, at each of the plurality of output steps, a second higher order textual feature representation for a corresponding first higher order textual feature representation in a shared latent representation space;
receiving, as input to a second decoder of the speech recognition model, the second higher order textual feature representation generated by the shared audio-text encoder at each of the plurality of output steps; and
generating, by the second decoder, at each of the plurality of output steps, a second probability distribution over possible text units,
wherein training the speech recognition model is further based on the second probability distribution over possible text units generated by the second decoder at each of the plurality of output steps for each unspoken textual utterance in the set of unspoken textual utterances.

18. The system of claim 17, wherein the operations further comprise:
receiving a set of transcribed speech utterances, each transcribed speech utterance in the set of transcribed speech utterances paired with a corresponding transcription and represented by a corresponding sequence of acoustic frames; and
for each transcribed speech utterance in the set of transcribed speech utterances:
generating, by an audio encoder of the speech recognition model, at each of a plurality of output steps, a first higher order audio feature representation for a corresponding acoustic frame in the sequence of acoustic frames representing the transcribed speech utterance;
receiving, as input to the first decoder of the speech recognition model, the first higher order audio feature representation generated by the audio encoder at each of the plurality of output steps; and
generating, by the first decoder, at each of the plurality of output steps, a first probability distribution over possible speech recognition hypotheses,
wherein training the speech recognition model is further based on the first probability distribution over possible speech recognition hypotheses generated by the first decoder at each of the plurality of output steps for each transcribed speech utterance in the set of transcribed speech utterances.

19. The system of claim 18, wherein the operations further comprise, for each transcribed speech utterance in the set of transcribed speech utterances:
receiving, as input to the shared audio-text encoder of the speech recognition model, the first higher order audio feature representation generated by the audio encoder at each of the plurality of output steps;
generating, by the shared audio-text encoder, at each of the plurality of output steps, a second higher order audio feature representation for a corresponding first higher order audio feature representation in the shared latent representation space;
receiving, as input to the second decoder of the speech recognition model, the second higher order audio feature representation generated by the shared audio-text encoder at each of the plurality of output steps; and
generating, by the second decoder, at each of the plurality of output steps, a second probability distribution over possible speech recognition hypotheses,
wherein training the speech recognition model is further based on the second probability distribution over possible speech recognition hypotheses generated by the second decoder at each of the plurality of output steps for each transcribed speech utterance in the set of transcribed speech utterances.

20. The system of claim 19, wherein training the speech recognition model comprises jointly training the speech recognition model using the first and second probability distributions over possible text units and the first and second probability distributions over possible speech recognition hypotheses.

21. The system of claim 19, wherein the operations further comprise:
receiving, at a contextual finite-state transducer (FST), the second probability distribution over possible speech recognition hypotheses;
determining, using the contextual FST, context scores for each possible speech recognition hypotheses of the second probability distribution based on context data; and
executing a beam search decoding process to select a respective one of the possible speech recognition hypotheses of the second probability distribution based on the context scores and the second probability distribution.

22. The system of claim 13, wherein the first decoder comprises:
a prediction network configured to:
receive, as input, a sequence of N previous non-blank symbols output by a final Softmax layer; and
generate, at each of the plurality of output steps, a dense representation; and
a joint network configured to:
receive, as input, the first higher order textual feature representation generated by the text encoder at each of the plurality of output steps and the dense representation generated by the prediction network at each of the plurality of output steps; and
generate, at each of the plurality of output steps, the first probability distribution over possible text units.

23. The system of claim 13, wherein the operations further comprise, for each respective training data pair:
upsampling, using a parameter-free duration model, a distribution of the sequence of sub-word units tokenized from the respective training data pair; and
randomly masking a portion of the upsampled distribution of the sequence of sub-word units.

24. The system of claim 13, wherein:
each sub-word unit in the sequence of sub-word units comprises one of a phoneme or a wordpiece; and
each text unit in the first probability distribution over possible text units comprises a wordpiece.

* * * * *